United States Patent
Cai et al.

(10) Patent No.: US 12,236,100 B2
(45) Date of Patent: Feb. 25, 2025

(54) OPERATING METHOD, MEMORY CONTROLLER, AND MEMORY SYSTEM

(71) Applicant: Yangtze Memory Technologies Co., Ltd., Hubei (CN)

(72) Inventors: Jin Cai, Hubei (CN); Xianwu Luo, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 43 days.

(21) Appl. No.: 18/091,016

(22) Filed: Dec. 29, 2022

(65) Prior Publication Data

US 2024/0211144 A1    Jun. 27, 2024

(30) Foreign Application Priority Data

Nov. 24, 2022   (CN) .......................... 202211486127.X

(51) Int. Cl.
*G06F 3/06*   (2006.01)

(52) U.S. Cl.
CPC .......... *G06F 3/0616* (2013.01); *G06F 3/0653* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,600,376 | B1* | 3/2017 | Krinke, II | G06F 11/1464 |
| 2006/0010174 | A1* | 1/2006 | Nguyen | G06F 11/1458 |
| 2006/0282627 | A1* | 12/2006 | Aggarwal | G06F 3/0644 |
| | | | | 711/154 |
| 2013/0185495 | A1* | 7/2013 | Benhase | G06F 12/0833 |
| | | | | 711/E12.078 |
| 2018/0129600 | A1* | 5/2018 | Ishiyama | G06F 11/1076 |

* cited by examiner

*Primary Examiner* — Yaima Rigol
*Assistant Examiner* — Alexander J Yoon
(74) *Attorney, Agent, or Firm* — Oblon, McClelland, Maier & Neustadt, L.L.P.

(57) ABSTRACT

The present disclosure is directed to an operating method of a memory controller, a memory controller, a memory system, and an electronic device. Herein, the operating method can include determining a backup region to be used in an idle state from a memory array, when detecting that remaining capacity of a currently used backup region for storing redundancy parity data in the memory array is less than a required capacity of redundancy parity data to be written, determining the quantity of all backup regions for storing redundancy parity data including the backup region to be used in the memory array, deciding whether the quantity is larger than a preset threshold, and erasing backup regions having stored redundancy parity data in the memory array when the quantity is larger than the preset threshold.

20 Claims, 10 Drawing Sheets

When all L2 Parity has been backed up to the new backup region to be used, and there is no need to preserve the used backup region

| Used backup region | | New backup region to be used |

FIG.9

OPERATING METHOD, MEMORY CONTROLLER, AND MEMORY SYSTEM

CROSS-REFERENCE OF RELATED APPLICATIONS

The present application claims the benefit of priority to China Application No. 202211486127.X, filed on Nov. 24, 2022, the content of which is incorporated herein by reference in its entirety.

TECHNICAL FIELD

The present disclosure relates to a technical field of data storage, and more particularly, to an operating method of a memory controller, a memory controller, a memory system, and an electronic device.

BACKGROUND

In a memory system, before some operations are performed, some volatile data in the memory controller included in the memory system need to be back up for subsequent data reconstruction. The currently used data backup mode renders less Over provisioning (OP) of the memory system, which affects performance and service life of the memory system.

SUMMARY

In view of this, embodiments of the present disclosure provide an operating method of a memory controller, a memory controller, a memory system and an electronic device.

In a first aspect, an embodiment of the present disclosure provides an operating method of a memory controller that is included in a memory system. The memory system further includes a memory having a memory array and controlled by the memory controller. The operating method includes determining a backup region to be used in an idle state from the memory array, when detecting that remaining capacity of a currently used backup region for storing redundancy parity data in the memory array is less than a required capacity of redundancy parity data to be written, determining the quantity of all backup regions for storing redundancy parity data including the backup region to be used in the memory array, deciding whether the quantity is larger than a preset threshold, and erasing backup regions having stored redundancy parity data in the memory array, when the quantity is larger than the preset threshold.

In a second aspect, an embodiment of the present disclosure further provides a memory controller that is included in a memory system. The memory system further includes a memory having a memory array and controlled by the memory controller. The memory controller includes a processor. The processor is configured to determine a backup region to be used in an idle state from the memory array, when detect that remaining capacity of a currently used backup region for storing redundancy parity data in the memory array is less than a required capacity of redundancy parity data to be written, determine the quantity of all backup regions for storing redundancy parity data including the backup region to be used in the memory array, decide whether the quantity is larger than a preset threshold, and erase backup regions having stored redundancy parity data in the memory array, when the quantity is larger than the preset threshold.

In a third aspect, an embodiment of the present disclosure further provides a memory system, including one or more memories having a memory array, and a memory controller coupled with the one or more memories and used to control the one or more memories. The memory controller includes a processor that is configured to determine a backup region to be used in an idle state from the memory array, when detecting that remaining capacity of a currently used backup region for storing redundancy parity data in the memory array is less than a required capacity of redundancy parity data to be written, determine the quantity of all backup regions for storing redundancy parity data including the backup region to be used in the memory array, decide whether the quantity is larger than a preset threshold and erase backup regions having stored redundancy parity data in the memory array, when the quantity is larger than the preset threshold.

In a fourth aspect, an embodiment of the present disclosure further provides an electronic device, including a memory system that includes one or more memories, and the one or more memories include a memory array, a memory controller coupled with the one or more memories and used to control the one or more memories, and a host coupled with the memory system. The memory controller includes a processor that is configured to determine a backup region to be used in an idle state from the memory array, when detect that remaining capacity of a currently used backup region for storing redundancy parity data in the memory array is less than a required capacity of redundancy parity data to be written, determine the quantity of all backup regions for storing redundancy parity data including the backup region to be used in the memory array, decide whether the quantity is larger than a preset threshold, and erase backup regions having stored redundancy parity data in the memory array, when the quantity is larger than the preset threshold.

The embodiments of the present disclosure provide an operating method of a memory controller, a memory controller, a memory system, and an electronic device. Wherein, the operating method includes: determining a backup region to be used in an idle state from the memory array, when detecting that remaining capacity of a currently used backup region for storing redundancy parity data in the memory array is less than a required capacity of redundancy parity data to be written, determining the quantity of all backup regions for storing redundancy parity data including the backup region to be used in the memory array, deciding whether the quantity is larger than a preset threshold, and erasing backup regions having stored redundancy parity data in the memory array, when the quantity is larger than the preset threshold. In the operating method provided by the embodiment of the present disclosure, after determining a new backup to be used, decide whether the total quantity of backup regions is larger than the preset threshold, when the quantity is larger than the preset threshold, erase the used backup regions to only maintain backup regions whose quantity is less than or equal to the preset threshold, and reduce a service life cycle of the used backup regions, so as to increase OP and improve performance and durability of the storage device.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 9 shows a schematic diagram II of a factor that causes the phenomenon of FIG. 7 discovered in the study according to the present disclosure:

DETAILED DESCRIPTION

Figure 1:
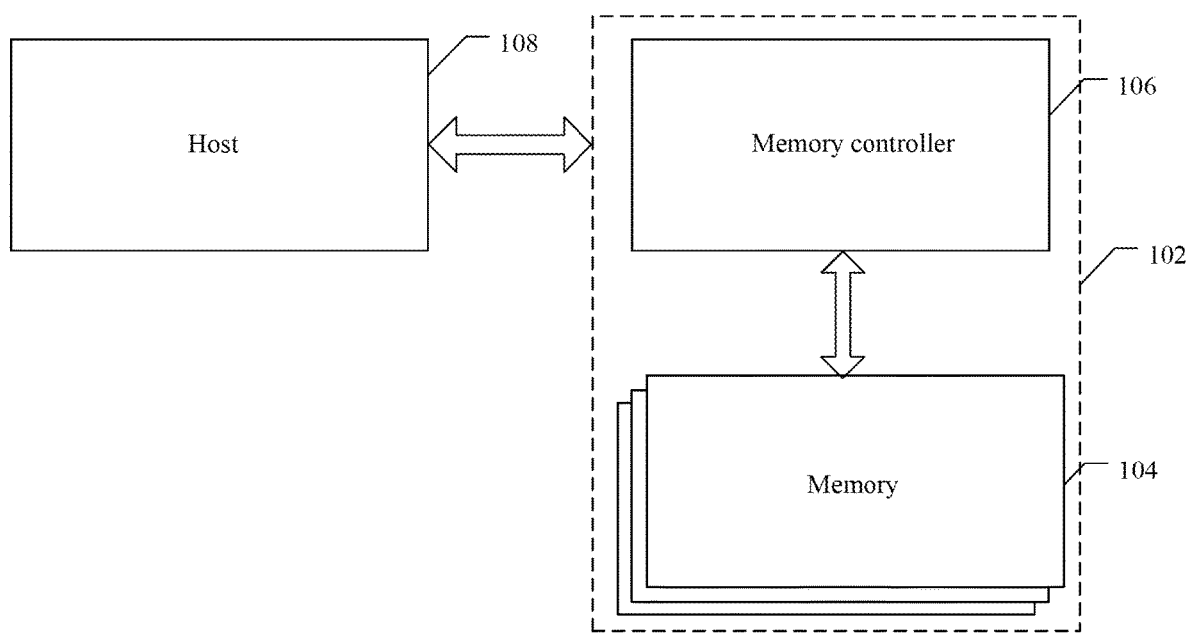
FIG. 1 shows a schematic diagram of an exemplary system having a memory system.

Exemplary embodiments of the present disclosure will be described in more detail below with reference to the accompanying drawings. While exemplary embodiments of the present disclosure are shown in the drawings, it should be understood that, the present disclosure may be implemented in various forms and should not be construed as limited to the embodiments set forth herein. Rather, these embodiments are provided for a thorough and complete understanding of the present disclosure, and for fully convey of the scope of the present disclosure to those skilled in the art.

In the following description, a lot of specific details are given to provide a more thorough understanding of the present disclosure. However, it will be apparent to those skilled in the art that the present disclosure may be implemented without one or more of these details. In other examples, in order to avoid confusion with the present disclosure, some technical features known in the art may not be described: that is, all features of the actual embodiment may not be described here, and well-known functions and structures may not be described in detail.

In the drawings, for clarity, sizes of layers, regions, elements and relative sizes thereof may be exaggerated. Same reference signs throughout the disclosure represent same elements.

It should be understood that when an element or a layer is referred to as "on", "adjacent to", "connected to" or "coupled to" other elements or layers, it may be directly on, adjacent to, connected to or coupled to other elements or layers, or there may be an intermediate element or layer. On the contrary, when an element is referred to as "directly on", "directly adjacent to", "directly connected to" or "directly coupled to" other elements or layers, there are no intervening elements or layers. It should be understood that although the terms first, second, third, etc. may be used to describe various elements, components, regions, layers and/or parts, these elements, components, regions, layers and/or parts should not be limited by these terms. These terms are only used to distinguish one element, component, region, layer or part from another element, component, region, layer or part. Therefore, without departing from the teachings of the present disclosure, a first element, component, region, layer or part discussed below may be represented as a second element, component, region, layer or part. However, when a second element, component, region, layer or part is discussed, it does not mean that a first element, component, region, layer or part necessarily exists in the present disclosure.

Spatial relationship terms such as "under", "below", "lower", "beneath", "above", "upper", etc. may be used herein for convenience of description to describe a relationship between one element or feature and other elements or features shown in the diagram. It should be understood that in addition to the orientation shown in the diagram, the spatial relationship terms are intended to include different orientations of devices in use and operation. For example, if the devices in the drawings are turned over, then elements or features described as "below", "under" or "beneath" other elements or features will be oriented to "above" other elements or features. Thus, the exemplary terms "below" and "under" may include upper and lower orientations. The device may be additionally oriented (rotated 90 degrees or in other orientations) and the spatial descriptors used herein are interpreted accordingly.

The terminology used herein is for the purpose of describing specific embodiments only and is not intended to be limiting of the disclosure. As used herein, the singular forms "a," "an," and "the" may be intended to include the plural forms as well, unless the context clearly indicates otherwise. It should be also understood that the terms "consist of" and/or "comprises" when used in this specification, specify the presence of stated features, integers, steps, operations, elements, and/or components, but do not exclude the presence or addition of one or more other features, integers, steps, operations, elements, components, and/or groups thereof. As used herein, the term "and/or" includes any and all combinations of items listed in relation thereto.

In order to understand the characteristics and technical content of the embodiments of the present disclosure in more detail, the implementation of the embodiments of the present disclosure is described in detail below in conjunction with the accompanying drawings. The accompanying drawings are for reference only and are not intended to limit the embodiments of the present disclosure.

FIG. 1 shows a block diagram of an exemplary electronic device having a memory system. In FIG. 1, the electronic device 100 may be a mobile phone, a desktop computer, a laptop computer, a tablet computer, a vehicle computer, a game console, a printer, a positioning device, a wearable electronic device, an intelligent sensor, a Virtual Reality (VR) device, an Argument Reality (AR) device or any other suitable electronic device having a memory. As shown in FIG. 1, the electronic device 100 may include a host 108 and a memory system 102, wherein, the memory system 102 has one or more memories 104 and a memory controller 106: the host 108 may be a processor of the electronic device, for example, a Central Processing Unit (CPU) or a System of Chip (SoC), wherein, the system of chip may be, for example, an Application Processor (AP). The host 108 may be configured to send data to the memory 104 through the memory controller 106 or receive data from the memory 104 through the memory controller 106. Specifically, the memory 104 may be any memory disclosed in the present disclosure, for example, a Phase Change Random Access Memory (PCRAM), a three-dimensional NAND flash memory, etc.

According to some implementations, the memory controller 106 is coupled to the memory 104 and the host 108, and is configured to control the memory 104. The memory controller 106 may manage data stored in the memory 104 and communicate with the host 108. In some embodiments, the memory controller 106 is designed to operate in a low duty cycle environment, for example, in a Secure Digital (SD) card, a Compact Flash (CF) card, a Universal Serial Bus (USB) flash drive, or other media for use in electronic devices in low duty cycle environments, such as personal calculators, digital cameras, mobile phones, and/or the like. In some embodiments, the memory controller 106 is designed to operate in a high duty cycle environment, for example, in a Solid State Drive (SSD) or an embedded Multi Media Card (eMMC), wherein, the SSD or the eMMC are used as a data storage device and an enterprise memory array for mobile devices of a high duty cycle environment, such as smart phones, tablet computers, laptop computers, etc. The memory controller 106 may be configured to control operations of the memory 104, for example, read, erase, and program operations.

In some embodiments, the memory controller 106 may further be configured to manage various functions regarding data stored or to be stored in the memory 104, wherein, these functions include but are not limited to bad block management, garbage collection, logical-to-physical address translation, loss equalization, etc. In some implementations, the memory controller 106 is further configured to process an Error Correction Code (ECC) regarding data read from the memory 104 or written into the memory 104. In some embodiments, the memory controller 106 may further perform any other suitable function, for example, formatting the memory 104. The memory controller 106 may communicate with an external device (e.g., the host 108) according to a specific communication protocol. For example, the memory controller 106 may communicate with external devices through at least one of various interface protocols, for example, the USB protocol, the MMC protocol, the Peripheral Component Interconnection (PCI) protocol, the PCI Express (PCI-E) protocol, the Advanced Technology Attachment (ATA) protocol, the Serial ATA protocol, the Parallel ATA protocol, the Small Computer Small Interface (SCSI) protocol, the Enhanced Small Disk Interface (ESDI) protocol, the Integrated Drive Electronics (IDE) protocol, the Firewire protocol, etc. These interfaces may also be referred to as front-end interfaces. In some embodiments, the memory controller 106 performs command/data interaction with the memory 104 through a plurality of configured channels. These channels are also referred to as back-end interfaces.

Figure 2:
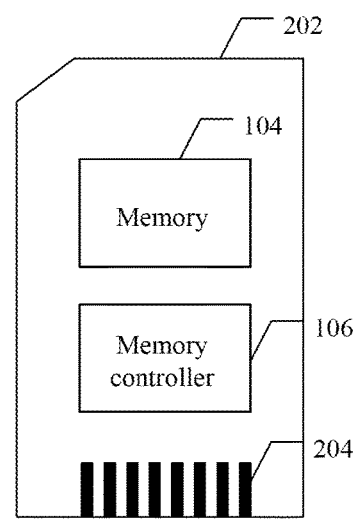
FIG. 2 shows a schematic diagram of an exemplary memory card having a memory.

In some embodiments, the memory controller 106 and the one or more memories 104 may be integrated into various types of storage devices, for example, included in a same package (e.g., a Universal Flash Storage (UFS) package or an eMMC package). That is to say, the memory system 102 may be implemented and packaged into different types of terminal electronic products. In an example as shown in FIG. 2, the memory controller 106 and a single memory 104 may be integrated into a memory card 202. The memory card may include a Personal Computer Memory Card International Association (PCMCIA, PC) card, a CF card, a Smart Media (SM) card, a memory stick, a MMC (RS-MMC, MMCmicro) card, an SD (miniSD, microSD, SDHC) card, UFS, etc. The memory card may further include a memory card connector 204 that couples the memory card to a host (e.g., the host 108 in FIG. 1).

Figure 3:
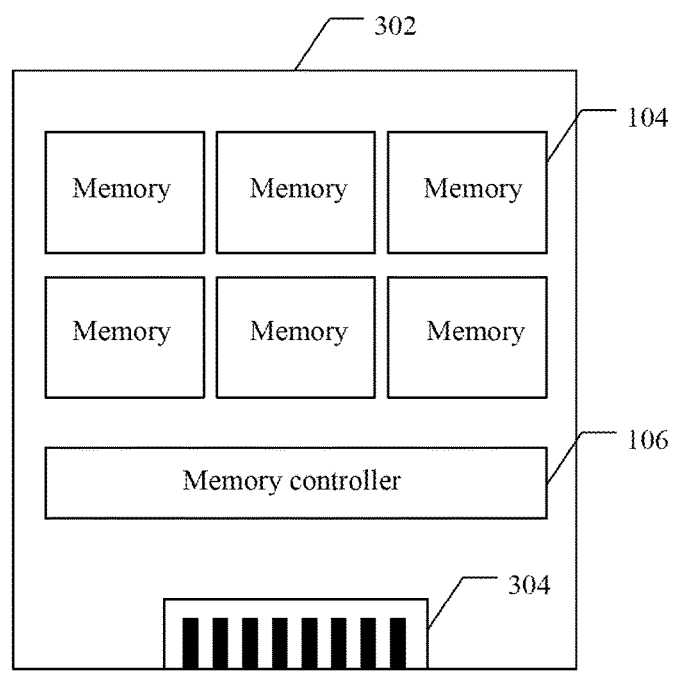
FIG. 3 shows a schematic diagram of an exemplary Solid State Disk (SSD) having a memory.

In another example shown in FIG. 3, the memory controller 106 and a plurality of memories 104 may be integrated into an SSD 302. The SSD may further include an SSD connector 304 that couples the SSD to a host (e.g., the host 108 in FIG. 1). In some implementations, memory capacity and/or an operation speed of the SSD is larger than memory capacity and/or an operation speed of the memory card.

Figure 4:
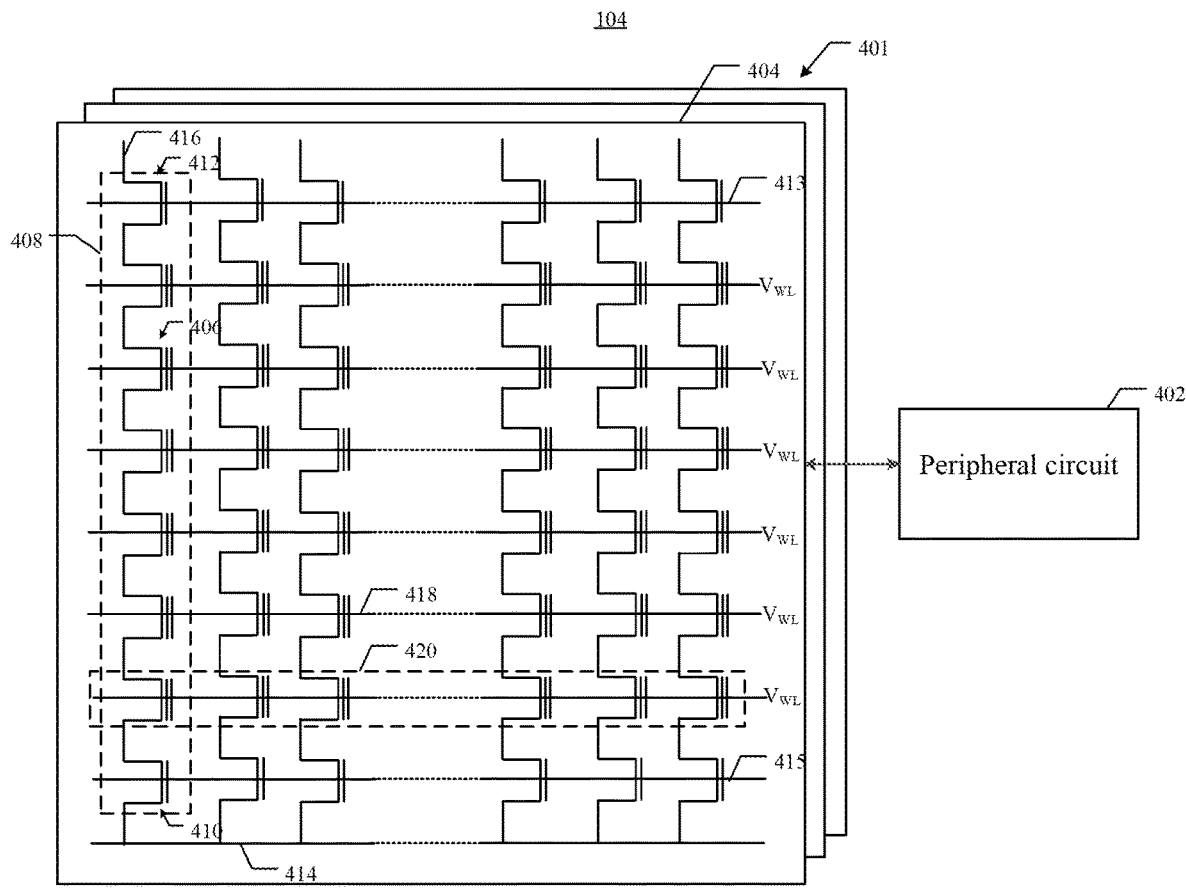
FIG. 4 shows an example diagram of an exemplary memory including a peripheral circuit.

In some embodiments, a structure of the memory 104 may be as that of the exemplary memory including a peripheral circuit shown in FIG. 4. As shown in FIG. 4, the memory 104 may include a memory array 401 and a peripheral circuit 402 coupled to the memory array 401, wherein, the memory array 401 may be a NAND flash memory array, wherein, a memory cell 406 is provided in a form of an array of NAND memory strings 408, and each NAND memory string 408 extends vertically above a substrate (not shown). In some embodiments, each NAND memory string 408 includes a plurality of memory cells 406 that are coupled in series and stacked vertically. Each memory cell 406 may maintain a continuous analog value, for example, voltage or charge, depending on the quantity of electrons captured in a memory region of the memory cell 406. Each memory cell 406 may be a floating gate type memory cell including a floating gate transistor, or a charge capture type memory cell including a charge capture transistor.

In some embodiments, each memory cell 406 is a Single Level Cell (SLC) that has two possible data states and therefore may store one bit of data, for example, a first data state "0" may correspond to a first voltage range, and a second data state "1" may correspond to a second voltage range. In some embodiments, the first voltage range and the second voltage range may be referred to as a threshold voltage distribution of the memory cell. In some embodiments, each memory cell 406 has more than four data states and a Multi Level Cell (MLC) that stores multi-bit data, for example, the MLC may store two bits per memory cell, or store three bits per memory cell (also referred to as a Trinary Level Cell (TLC)), or store four bits per memory cell (also referred to as a Quadruple Level Cell (QLC)), and so on. Wherein, a data state of any type of memory cell includes an erase state and a program state. In some embodiments, when performing a program operation on the memory cell, a memory cell in an erase state is programmed to a certain program state: generally speaking, a voltage value in a voltage range corresponding to the program state of the memory cell is relatively large.

As shown in FIG. 4, each NAND memory string 408 may include a Source Selection Gate (SSG) 410 at a source end thereof and a Drain Selection Gate (DSG) 412 at a drain end thereof. The SSG 410 and the DSG 412 may be configured to activate a selected NAND memory string 408 (an column of the array) during read and program (or write) operations. In some embodiments, source of NAND memory strings 408 in a same block 404 are coupled through a same source line (SL) 414 (e.g., a common SL). In other words, according to some implementations, all NAND memory strings 408 in a same block 404 have an Array Common Source (ACS). According to some implementations, a DSG 412 of each NAND memory string 408 is coupled to a corresponding bit line 416, and data may be read and written from the bit line 416 via an output bus (not shown). In some embodiments, each NAND memory string 408 is configured to be selected or deselected by applying a selection voltage (e.g., higher than a threshold voltage of a transistor having DSG 412) or a deselection voltage (e.g., 0) volts (V)) to a corresponding DSG 412 via one or more DSG lines 413 and/or applying a selection voltage (e.g., higher than a threshold voltage of a transistor having SSG 410) or a deselection voltage (e.g., 0) volts) to a corresponding SSG 410 via one or more SSG lines 415.

As shown in FIG. 4, the NAND memory string 408 may be organized into a plurality of blocks 404, and each of the plurality of blocks 404 may have a common source line 414 (e.g., coupled to the ground). In some embodiments, each block 404 is a basic data unit having an erase operation, that is, all memory cells 406 on a same block 404 are erased simultaneously. In order to erase memory cells 406 in a selected block 404, the memory cells 406 may be coupled to the selected block 404 and source lines 414 of an unselected block 404 in a same plane as the selected block 404 with an erase voltage (Vers) (e.g., a high positive voltage of 20 V or higher) bias. It should be understood that, in some examples, the erase operation may be performed at a half block level, at a quarter block level, or at a level of any suitable quantity of blocks or any suitable fraction of a block. Memory cells 406 of adjacent NAND memory strings 408 may be coupled through a word line 418, and the word line 418 selects which row of memory cells 406 to receive read and program operations. In some embodiments, the memory cells 406 coupled to a same word line 418 are referred to as a page 420. The page 420 is a basic data unit used in a program or read operation, a size of a word line 418 in a block 404. Each word line 418 may include a plurality of control gates (gate electrodes) at each memory cell 406 in a corresponding page 420 and gate lines coupling the control gates.

Returning to FIG. 4, the peripheral circuit 402 may be coupled to the memory array 401 through the bit line 416, the word line 418, the source line 414, the SSG line 415 and the DSG line 413. The peripheral circuit 402 may include any suitable analog, digital, and mixed signal circuits, to apply a voltage signal and/or a current signal to each target memory cell 406 and sense a voltage signal and/or a current signal from each target memory cell 406 via the bit line 416, the word line 418, the source line 414, the SSG line 415, and the DSG line 413, so as to facilitate operations of the memory array 401. The peripheral circuit 402 may include various types of peripheral circuits formed by using a Metal Oxide Semiconductor (MOS) technology. For example, FIG. 5 shows some exemplary peripheral circuits, and the peripheral circuits 402 include a page buffer/sense amplifier 504, a column decoder/bit line driver 506, a row decoder/ word line driver 508, a voltage generator 510, a control logic unit 512, a register 514, an interface 516, and a data bus 518.

Figure 5:
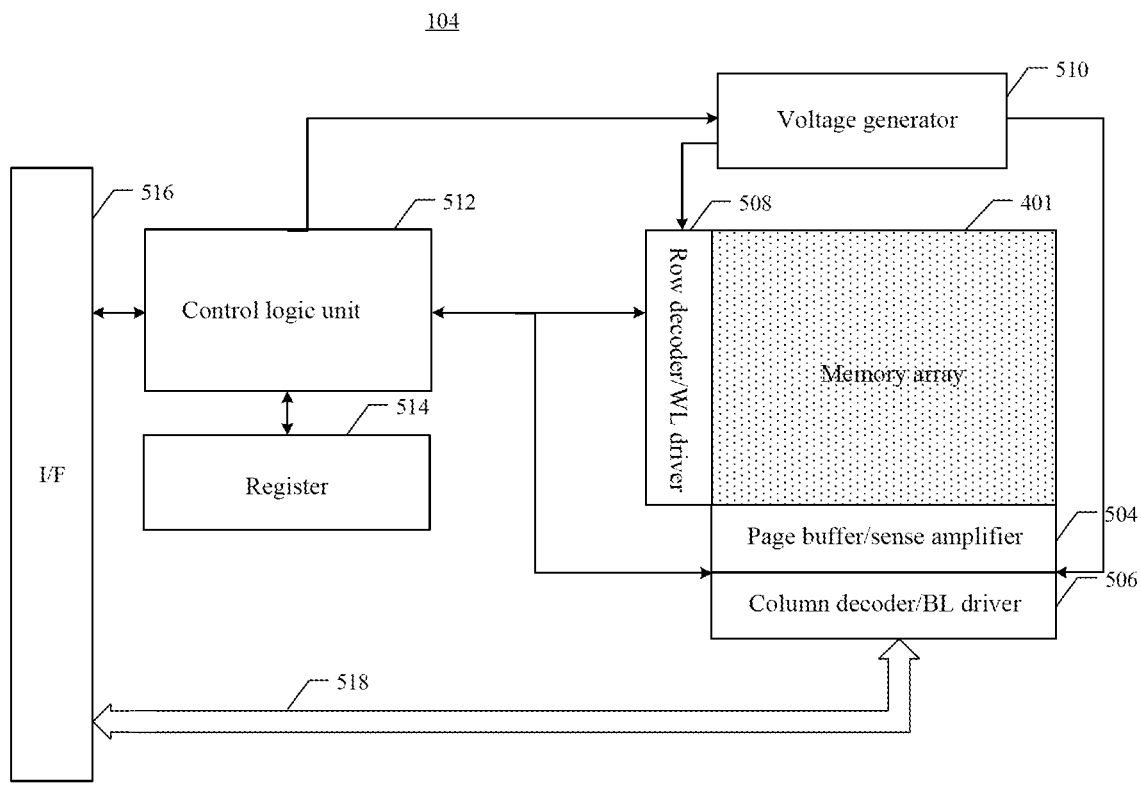
FIG. 5 shows a schematic diagram of an exemplary memory including a memory array and a peripheral circuit.

It should be understood that in some examples, additional peripheral circuits not shown in FIG. 5 may also be included.

In some embodiments, the page buffer/sense amplifier 504 may be configured to read data from the memory array 401 and program (write) data to the memory array 401 according to a control signal from the control logic unit 512. In one example, the page buffer/sense amplifier 504 may store one page of program data (write data) to be programmed to one page 420 of the memory array 401. In another example, the page buffer/sense amplifier 504 may perform a program verification operation, to ensure that data has been correctly programmed into the memory cell 406 coupled to a selected word line 418. In still another example, the page buffer/sense amplifier 504 may further sense a low power signal from the bit line 416 that represents data bits stored in the memory cell 406, and amplify a small voltage swing to a recognizable logic level in a read operation. The column decoder/bit line driver 506 may be configured to be controlled by the control logic unit 512, and select one or more NAND memory strings 408 by applying a bit line voltage generated from the voltage generator 510.

The row decoder/word line driver 508 may be configured to be controlled by the control logic unit 512, select/deselect the block 404 of the memory array 401, and select/deselect the word line 418 of block 404. The row decoder/word line driver 508 may be further configured to drive the word line 418 by using a word line voltage generated from the voltage generator 510. In some implementations, the row decoder/ word line driver 508 may further select/deselect and drive the SSG line 415 and the DSG line 413. In some embodiments, the row decoder/word line driver 508 is configured to perform an erase operation on a memory cell 406 coupled to (one or more) selected word lines 418. The voltage generator 510 may be configured to be controlled by the control logic unit 512, and generate a word line voltage (e.g., a read voltage, a program voltage, a passing voltage, a local voltage, a verification voltage, etc.), a bit line voltage, and a source line voltage to be supplied to the memory array 401.

The control logic unit 512 may be coupled to each peripheral circuit as described above, and configured to control an operation of each peripheral circuit. The register 514 may be coupled to the control logic unit 512, and includes a state register, a command register, and an address register for storing state information, command operation codes (OP codes), and command addresses for controlling an operation of each peripheral circuit. The interface 516 may be coupled to the control logic unit 512, and act as a control buffer, to buffer a control command received from the host (not shown) and relay the control command to the control logic unit 512, and to buffer state information received from the control logic unit 512 and relay the buffer state information to the host. The interface 516 may also be coupled to the column decoder/bit line driver 506 via the data bus 518, and act as a data I/O interface and a data buffer, to buffer data and relay the data to the memory array 401 or relay or buffer data from the memory array 401. That is, the interface 516 here is an interface coupled with the back-end interface of the above-mentioned memory controller, that is, the interface 516 may also be an interface for communication between the memory and the memory controller.

The introduction of the memory array in FIG. 4 is an example based on an actual physical structure of the memory. In other words, the memory array in FIG. 4 is a location where data is actually stored, so the address where data is stored herein is a Physical address (PA), and may also be referred to as an actual address of the memory array. In practical application, for the electronic device shown in FIG.

1, the user may allocate a Logical Address (LA) through an Operating System (OS) included in the host 108, and write data to a corresponding physical address of the memory array, or read data from a corresponding physical address of the memory array, through a conversion algorithm between the logical address and the physical address on a Flash Translation Layer (FTL) in the memory system 102.

During actual application, the quantity of Blocks included in the memory array of the memory system included in the electronic device 100 is fixed. Usually, before a storage device (e.g., the above-mentioned SSD or UFS) leaves factory, a manufacturer divides the memory array included in the storage device according to usage thereof. In some embodiments, the memory array of the storage device is divided into a user data pool and a system pool, wherein, the user data pool further includes a memory region and Over provisioning (OP), and the memory region is just a region for storing user data in the memory array. Capacity of the region is also referred to as user capacity. The user may write data to and read data from the region, that is, the user may access the region. OP may refer to a region reserved by the manufacturer before the storage device leaves factory and not planned for usage; the portion of region may not be accessed by the user, and the host OS does not display the capacity of the portion, which is completely used by the SSD memory controller.

Here, the system pool may refer to a region planned to store management data in the storage device. The management data may include, but is not limited to, a mapping table of conversion from logical address to physical address (L2P) need to be used by the FTL algorithm, cache data backup of the memory controller, etc.

In some embodiments, the user data pool, the system pool and the over provisioning have relationships below: when actual capacity of the storage device is fixed, the larger capacity allocated to the system pool, the smaller capacity allocated to the user data pool, and at this time, if the user capacity is guaranteed to remain unchanged, the smaller the over provisioning will be: on the contrary, when the actual capacity of the storage device is fixed, the smaller capacity allocated to the system pool, the larger capacity allocated to the user data pool, and at this time, if the user capacity is guaranteed to remain unchanged, the larger the over provisioning will be. During actual use, a storage device with larger over provisioning may improve performance and usually may improve durability of the storage device, helping to increase service life of the storage device. Based on the above-described relationship, when the actual capacity of the storage device is fixed and the user capacity is guaranteed, the capacity allocated to the system pool may be appropriately reduced to improve performance and durability of the storage device.

Figure 6:
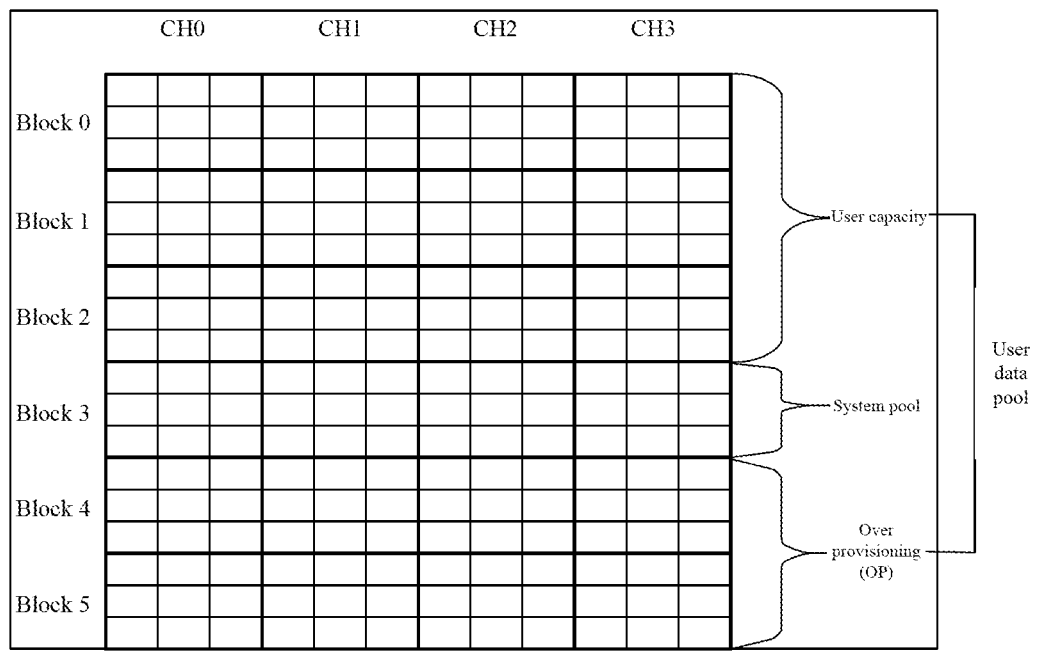
FIG. 6 shows a schematic diagram of a fictitious small SSD provided by the present disclosure.

For example, a fictitious small SSD is shown in FIG. 6. As shown in FIG. 6, it is assumed that an SSD contains 4 channels (CH0 to CH3), which are connected with 4 Dies (Dies on each channel may be operated in parallel): and it is assumed that each Die has 6 flash blocks (Block0 to Block5), and the SSD contains a total of 24 flash blocks (Blocks). There are 9 small blocks in each flash block, and a size of each small block is the same as a size of a logical page. In the scenario, a planning mode may be as follows: among the above-mentioned 24 flash blocks, it is assumed that a size of 12 flash blocks therein (e.g., Block0 to Block2) is SSD capacity (or user capacity), and a user may access the flash blocks of the portion of capacity. The other 4 flash blocks (Block3) are allocated to the system pool: at this time, Over Provisioning (OP) contains 8 flash blocks (Block4 to Block5). If the user capacity remains the same as 12 flash blocks, and if 8 flash blocks (Block3 to Block4) are allocated to the system pool, only 4 flash blocks (Block5) remain for the Over Provisioning (OP).

Based on the above-mentioned storage device and electronic device, some volatile data in the memory controller included in the memory system need to be backed up before some operations are performed. For example, when switching to a Start Stop Unit (SSU) mode, an Auto standby mode, or a Write Booster (WB) mode, the redundancy parity data in the memory controller needs to be backed up. For another example, when the backup region is reconstructed, the redundancy parity data in the memory controller needs to be backed up.

Figure 7:
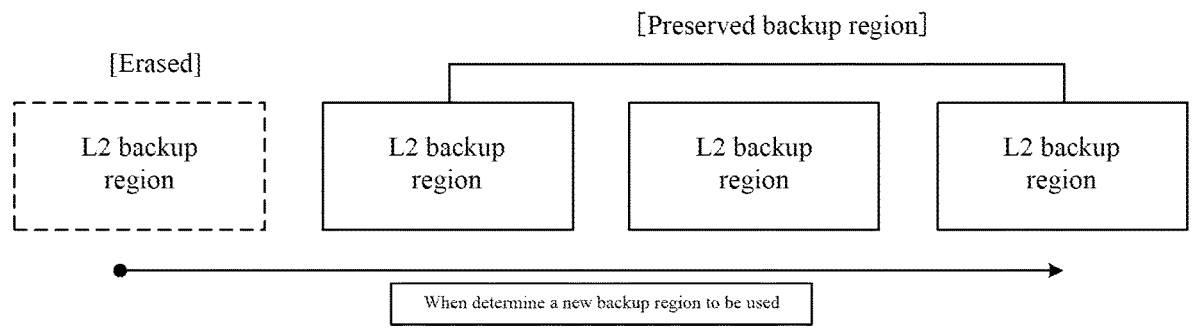
FIG. 7 shows an exemplary schematic diagram of the quantity of backup regions for storing L2 Parity according to the present disclosure.

During use, the quantity of backup regions allocated for storing L2 Parity in the memory array is relatively large, for example, as shown in FIG. 7, which shows an exemplary schematic diagram of the quantity of backup regions for storing L2 Parity according to the present disclosure. In FIG. 7, the quantity of backup regions (hereinafter briefly referred to as L2 backup regions) for storing L2 Parity remains about 2 to 3. The L2 backup region belongs to the system pool, so when the quantity of Blocks allocated to the system pool is large, the quantity of Blocks included in the OP will be less on the premise that the user capacity is ensured, that is, the OP will decrease, affecting service life and programming performance of the storage device. Wherein, L2 Parity may be L2 redundancy parity data, which may refer to redundancy parity data generated due to a write command sent by the host coupled to the storage device. It should be noted that the storage device contains two types of redundancy parity data; one is the redundancy parity data generated due to the write command sent by the host coupled to the storage device (or the memory controller or the memory system), briefly referred to as L2 Parity; the other is redundancy parity data generated due to Garbage Collection (GC), which may be briefly referred to as GC Parity. For different types of redundancy parity data, there are different backup regions and backup modes; and the present disclosure focuses on backup and related operations for L2 Parity. Therefore, unless otherwise specified, the redundancy parity data mentioned below refers to L2 Parity.

Figure 8:
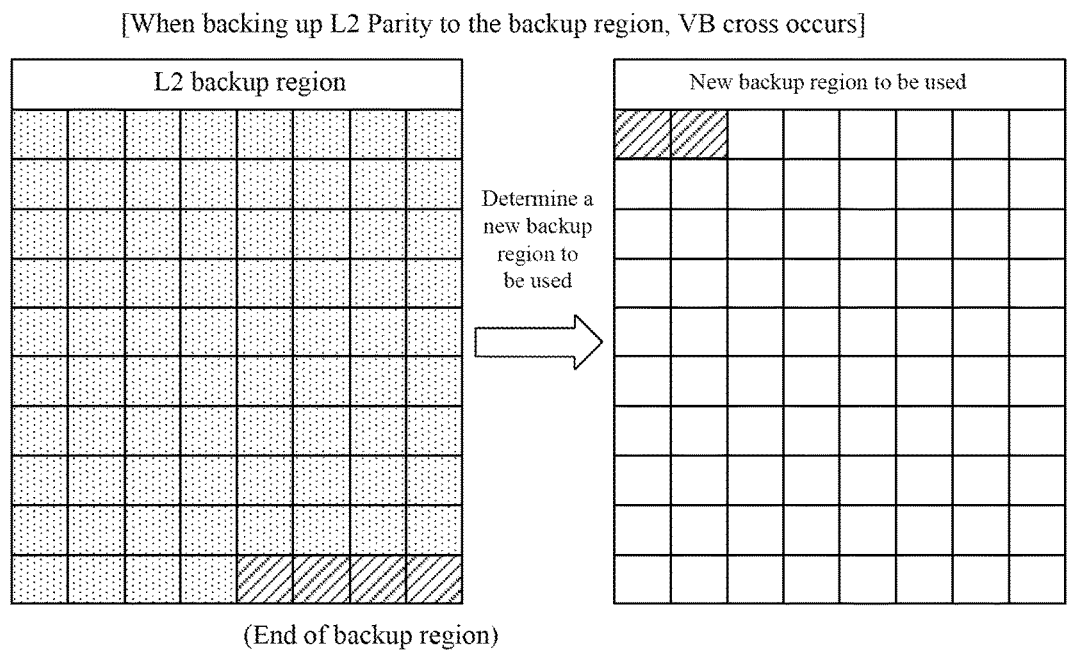
FIG. 8 shows a schematic diagram I of a factor that causes a phenomenon of FIG. 7 discovered in the study according to the present disclosure.

After study, the reason for the above-described situation where more backup regions of L2 Parity are preserved is shown in FIG. 8 and FIG. 9. It may be seen from FIG. 8 and FIG. 9 that when a new backup region to be used is created, a Cross VB phenomenon will occur. The Cross VB may refer to that when backing up L2 Parity, the amount of data to be written of L2 Parity is larger than the remaining capacity of the backup region being used; the L2 Parity to be written has a portion written to the used backup region and a portion written to a new backup region to be used, so that a same batch of L2 Parity is written to different backup regions, which situation is referred to as Cross VB. In such situation, at least one of the used backup region required will be preserved. For another reason, an erase operation on the used backup region will be performed the next time a new backup region is created. Then, as shown in FIG. 9, even if a backup operation has not occurred for a long time and a new backup region has not been created for a long time, even if the L2 Parity in the used backup region has been completely updated to the new backup region or been invalid (i.e., useless), the used backup region will still be preserved, resulting in a long service life cycle of the L2 Parity backup region in the system pool, which further reduces OP, and affects performance and durability of the storage device.

Figure 10:
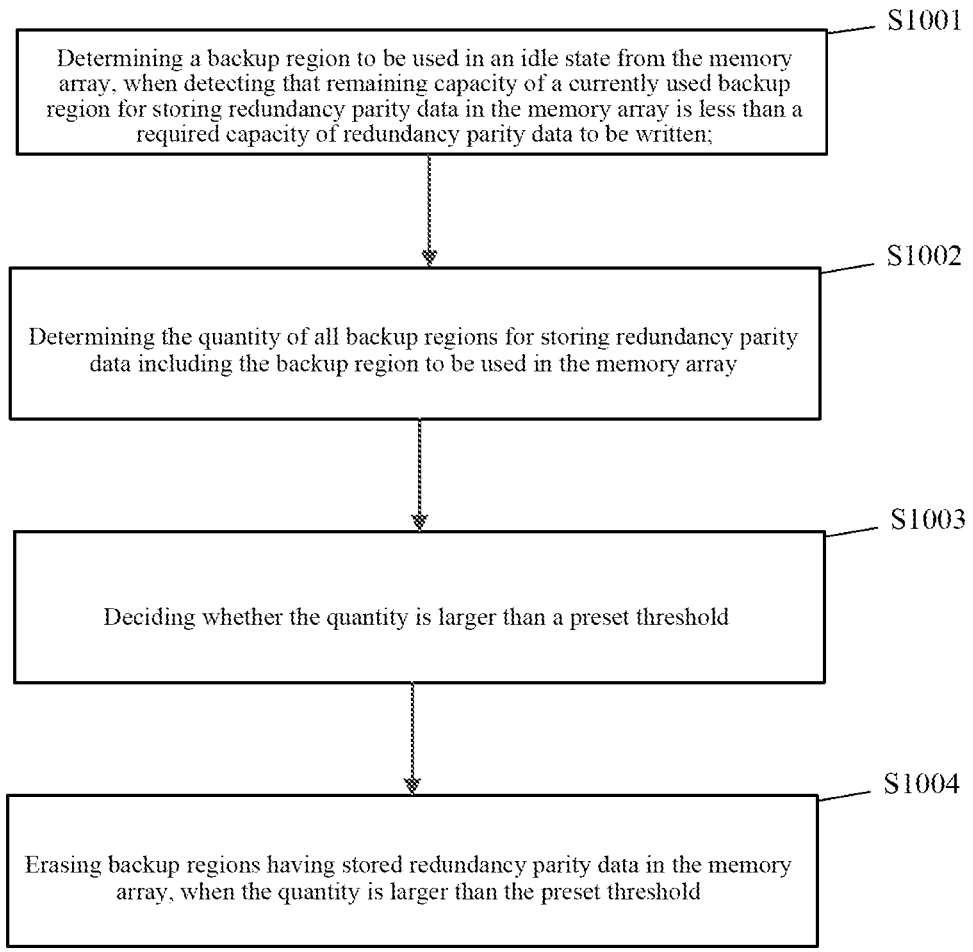
FIG. 10 shows a schematic flow chart of an operating method of a memory controller provided by the present disclosure.

To solve the above-described technical problems, referring to FIG. 10, the embodiment of the present disclosure provides an operating method of a memory controller. It should be noted that the memory controller is included in the memory system; the memory system further includes a memory having a memory array and controlled by the memory controller. Specifically, the operating method may include:

S1001: determining a backup region to be used in an idle state from the memory array, when detecting that remaining capacity of a currently used backup region for storing redundancy parity data in the memory array is less than a required capacity of redundancy parity data to be written;

S1002: determining the quantity of all backup regions for storing redundancy parity data including the backup region to be used in the memory array;

S1003: deciding whether the quantity is larger than a preset threshold; and

S1004: erasing backup regions having stored redundancy parity data in the memory array, when the quantity is larger than the preset threshold.

It should be noted that the operating method provided by the embodiment of the present disclosure may be performed on a memory controller (Controller) side. The above-described operations are management operations of the backup region for backing up L2 Parity in the system pool. Specifically, when the memory controller detects that the remaining capacity of the currently used backup region allocated for storing redundancy parity data is less than the a required capacity of redundancy parity data to be written, it determines the backup region to be used in an idle state from the memory array, that is, the memory controller looks up some Blocks in an idle state from the memory array as the backup region to be used; then, determines the quantity of all backup regions for storing redundancy parity data, including the backup region to be used, and decides whether the quantity is larger than the preset threshold; and when the quantity is larger than the preset threshold, directly erases the backup region having stored redundancy parity data in the memory array. The above-described operation is: when the quantity of all backup regions for storing redundancy parity data, including the backup region to be used, is larger than a certain preset threshold, erasing the used backup region, and only preserving the newly determined backup region to be used, that is, the quantity of backup regions for storing redundancy parity data (L2 Parity) in the system pool is maintained less than or equal to the preset threshold. The preset threshold may be 1.

In some embodiments, the memory controller looks up some Blocks in an idle state from the memory array, which may include: determining Blocks in an idle state, according to management program implementation for the memory array stored in the memory controller, for example, determining Blocks in an idle state by the effective data amount of each storage block maintained by firmware of the memory controller. During the above-mentioned determining the Blocks in an idle state based on the effective data amount of each storage block under maintenance, the Block in an idle state may refer to a Block with an effective data amount of 0. Actually, the Block in an idle state may refer to threshold voltage distribution of the included memory cell being in a voltage range where an erase state corresponding to a type of a memory cell (SLC or MLC or TLC or QLC) is located.

In some embodiments, the operating method may further include:

Setting a first backup flag; the first backup flag being used to indicate a backup mode of redundancy parity data in a redundancy parity cache of the memory controller;

Wherein, when the first backup flag is a first flag, the backup mode includes backing up all redundancy parity data in the memory controller to the backup region to be used.

It should be noted that, in actual implementation, a first backup flag bit may be preserved in the firmware included in the memory controller; the first backup flag bit is intended to indicate the backup mode of redundancy parity data in the redundancy parity cache of the memory controller. Specifically, the setting the first backup flag according to the present disclosure is also setting the first backup flag bit as described above. Wherein, when the first backup flag bit is set as the first flag, that is, when the first backup flag is the first flag, the backup mode includes backing up all redundancy parity data in the memory controller to the backup region to be used.

During actual application, the backing up all redundancy parity data in the memory controller to the backup region to be used herein may refer to backing up all L2 Parity in the memory controller to the backup region to be used.

In some embodiments, timing for setting the first backup flag includes, but is not limited to: setting the first backup flag as the first flag after completion of erasing the backup region having stored redundancy parity data; or, setting the first backup flag as the first flag, when determining that the quantity of all backup regions for storing redundancy parity data, including the backup region to be used, is larger than the preset threshold. Wherein, the first flag is 1 or 0, and a corresponding second flag hereinafter is 0 or 1. Specifically, the first flag and the second flag may be two different flags, as long as they are capable of differentiating between different situations.

Wherein, the redundancy parity cache is a region in the memory controller that is used for temporarily caching redundancy parity data. During actual application, the cache in the memory controller at least includes a L2 parity cache for caching L2 Parity and a GC parity cache for caching GC Parity. The redundancy parity cache according to the present disclosure may refer to the L2 parity cache. Under the above-mentioned two types of timing of setting the first backup flag as the first flag, the first backup flag is set as the first flag, so that when backing up redundancy parity data, the backup mode of backing up all redundancy parity data in the redundancy parity cache to the backup region to be used is employed. That is, L2 Parity corresponding to the L2 parity cache is backed up to the backup region to be used.

Specifically, one of the reasons for employing the backup mode of backing up all L2 Parity corresponding to the L2 parity cache may be the above-mentioned Cross VB phenomenon as described in FIG. 7. To expand, due to existence of Cross VB, redundancy parity data to be written will have a portion backed up to the backup region being used, and a portion backed up to the new backup region to be used; in this case, if the used backup region is erased without setting the first backup flag for all backups, the portion of redundancy parity data to be written that was to be previously backed up to the backup region being used will be lost.

Figure 11:
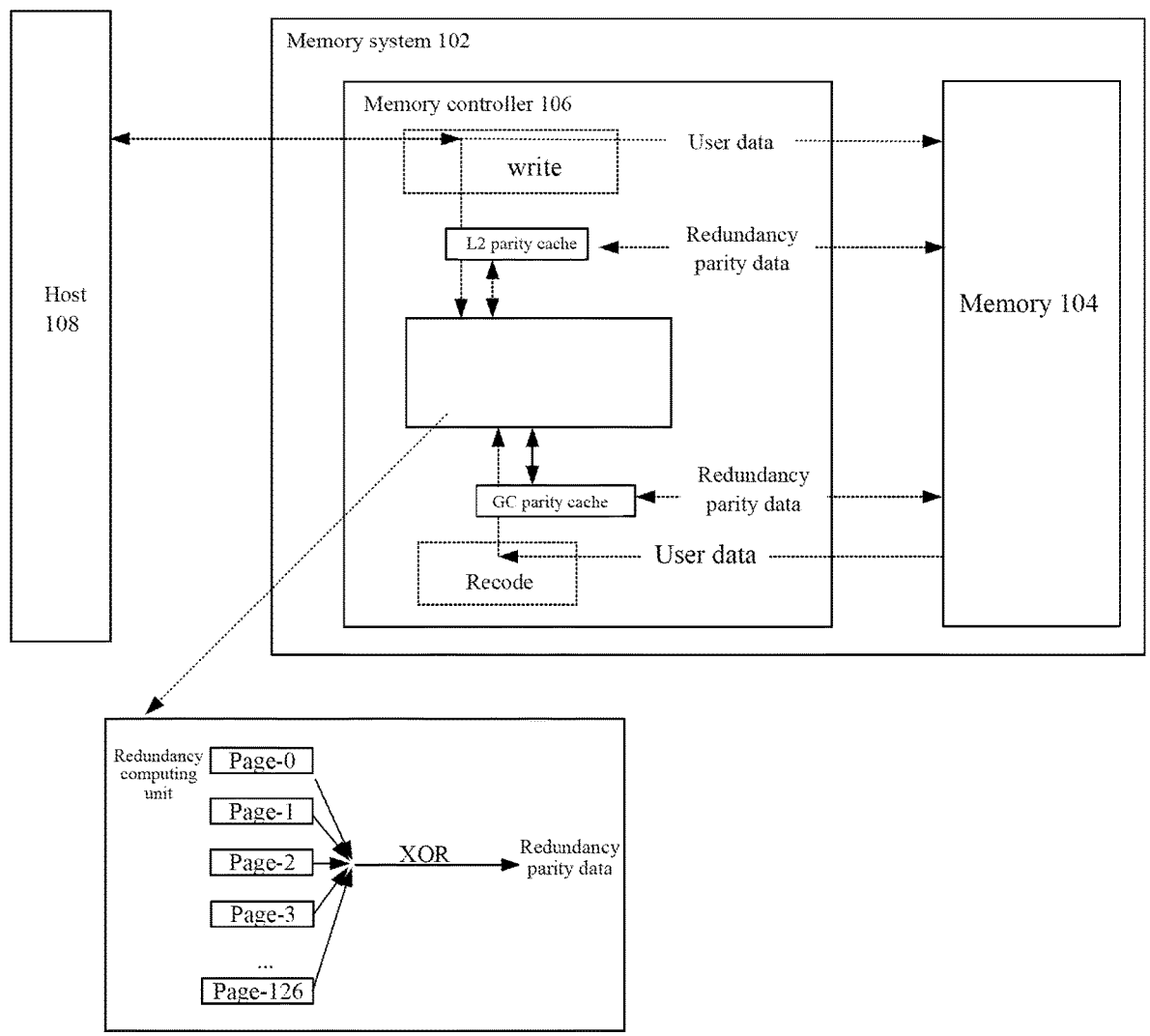
FIG. 11 shows a schematic diagram of data interaction between the host and the memory system provided by the present disclosure

In addition, a second reason for employing the backup mode of backing up all may be: a data interaction relationship between the host and the memory system as shown in FIG. 11; when the host writes a piece of user data (e.g., data written to a logical page) to the memory through memory control, the memory controller will obtain L2 Parity corresponding to the piece of data through a redundancy computing unit included, and temporarily store the L2 Parity in the redundancy parity cache (i.e., the L2 parity cache), and then write the L2 Parity to a specified memory region of the memory array that belongs to the user system pool (the memory region here is located in the user data pool) for subsequent error correction. Based on this, L2 Parity already stored in the memory region does not need to be backed up. The L2 Parity in the redundancy parity cache is newly generated and has not stored in the specified memory region. Therefore, only by backing up the newly generated L2 Parity, data loss can be avoided.

Therefore, based on the above-mentioned two reasons, when determining the new backup region to be used and erasing the used backup region, the backup mode of backing up all L2 Parity in the redundancy parity cache ensures safety of L2 Parity data.

It should be noted that FIG. 11 also shows a process of generating GC Parity when the memory controller performs a GC operation. During the GC process, when a piece of user data (garbage collected valid data) in the memory array needed to be rewritten to a new logical page, the memory controller will read the piece of user data; after recoding the piece of user data, the Parity for the piece of user data will be re-computed by the redundancy computing unit; at this time, the Parity is referred to as GC Parity and is temporarily stored in the GC parity cache. Then, the GC Parity is re-stored in the specified memory region of the memory array. It should be noted that in FIG. 11, an independent NAND redundancy array (RAIN) is built from logical pages Page0 to Page126; and storing L2 Parity or GC Parity in Page127 is only an example. In practice, there are other RAIN modes and L2 Parity or GC Parity storage modes. In addition, the two redundancy parity caches presented in FIG. 11 actually refer to one; here in order to clearly describe the two processes, they are drawn separately in two processes.

It should be noted that during actual planning, the capacity of the backup regions may be same; for example, all backup regions each have capacity of 100 MB, etc. Specifically, the capacity of the backup region may be determined according to capacity and usage of the storage device. In some embodiments, capacity of the backup region to be used is larger than capacity of the redundancy parity cache. Specifically, the capacity of the backup region to be used includes but is not limited to several times, tens of times, hundreds of times, etc. of the capacity of the redundancy parity cache. Specifically, a capacity relationship between the two needs to be determined according to actual situations.

In some embodiments, the operating method may further include: setting the first backup flag as the second flag, after responding to all redundancy parity data in the memory controller having been backed up to the backup region to be used; wherein, when the first backup flag is the second flag, the backup mode includes: backing up redundancy parity data in an updated state in the memory controller to the backup region to be used.

It should be noted that during actual application, the user may write data to the memory included in the storage device for a plurality of times, but not every time when the redundancy parity data generated by writing needs to be backed up, the remaining capacity of the backup region being used is insufficient; then, after all the redundancy parity data are backed up to the backup region to be used this time, the first backup flag bit needs to be set as the second flag, and recover to the original backup mode for subsequent use. Wherein, when the first backup flag is the second flag, the backup mode may include: backing up redundancy parity data in an updated state in the memory controller to the backup region to be used. That is, only the redundancy parity data in an updated state will be backed up, and the rest will not be backed up.

In some embodiments, the backing up all redundancy parity data in the memory controller to the backup region to be used, includes traversing redundancy parity data in the redundancy parity cache of the memory controller, and sequentially writing all the redundancy parity data in the redundancy parity cache into the backup region to be used.

During actual use, the traversing the redundancy parity data in the redundancy parity cache of the memory controller may refer to traversing L2 Parity in the L2 parity cache.

Specifically, the memory controller maintains a redundancy parity data memory table for L2 Parity, which is briefly referred to as a L2 memory table. The L2 memory table may be a linked list. Based on this, each node of the L2 memory table stores storage address information in the L2 parity cache corresponding to L2 Parity and a pointer pointing to a next node. In such case, the traversing L2 Parity in the L2 parity cache may include: starting from a root node of the L2 memory table, looking up the address information stored on nodes in the L2 memory table one by one based on a pointer stored on each node, obtaining L2 Parity corresponding to the address information, and backing up the obtained L2 Parity to the backup region to be used. In this way, all L2 Parity in the L2 parity cache will be traversed and obtained, and then all L2 Parity in the L2 parity cache will be backed up to the backup region to be used.

In some embodiments, the operating method may further include: backing up redundancy parity data to be written to the currently used backup region, when detecting that remaining capacity of the currently used backup region for storing redundancy parity data in the memory array is larger than or equal to the required capacity of the redundancy parity data to be written.

It should be noted that at this time, the first backup flag should be the second flag. The backup mode of backing up the redundancy parity data to be written to the currently used backup region is also the above-mentioned mode of backing up the redundancy parity data in an updated state to the currently used backup region. At this time, the redundancy parity data to be written may refer to the above-mentioned redundancy parity data in an updated state.

That is, in a case where the remaining capacity of the currently used backup region is sufficient, it is only necessary to back up the redundancy parity data in an updated state in the redundancy parity cache to the currently used backup region, wherein, the redundancy parity data in an updated state is just the redundancy parity data to be written. Then, the redundancy parity data will be programmed once acquired, so as to be stored in the backup region to be used.

In some embodiments, the operating method further includes: backing up the redundancy parity data to be written to the backup region to be used, when the quantity is less than or equal to the preset threshold.

It should be noted that at this time, the first backup flag should be the second flag. The backup mode of backing up the redundancy parity data to be written to the backup region to be used is just the above-mentioned mode of backing up the redundancy parity data in an updated state to the currently used backup region. At this time, the redundancy parity data to be written may refer to the above-mentioned redundancy parity data in an updated state.

Such case may happen when the user has not written data to the storage device for a long time; during the long time, the data in the storage device may have become invalid (useless), and the redundancy parity data in the backup region may have become invalid (useless). The memory controller already erases these backup regions during management. After a new backup region to be used is created, only one backup region to be used is included, which is sufficient to store the redundancy parity data to be written; at this time, it is only necessary to back up the redundancy parity data to be written to the backup region to be used. It should be noted that in such case, the redundancy parity data to be written may also be all the redundancy parity data in the redundancy parity cache.

In the present disclosure, in order to implement backing up the redundancy parity data in an updated state, in some embodiments, the backing up the redundancy parity data in an updated state in the memory controller to the backup region to be used may include determining a state of the redundancy parity data in the redundancy parity cache of the memory controller, and sequentially writing the redundancy parity data in an updated state into the backup region to be used.

In some embodiments, the determining a state of the redundancy parity data in the redundancy parity cache of the memory controller may include checking the second backup flag corresponding to the redundancy parity data, and determining a state of the redundancy parity data based on the second backup flag. When the second backup flag is a third flag, determining that the state of the redundancy parity data is an updated state; when the second backup flag is a fourth flag, determining that the state of the redundancy parity data is a non-updated state.

The process described above is that, the memory controller determines the state of the redundancy parity data by obtaining the second backup flag corresponding to the redundancy parity data in the redundancy parity cache. When the second backup flag is the third flag, the state of the corresponding redundancy parity data is an updated state; and when the second backup flag is the fourth flag, the state of the corresponding redundancy parity data is a non-updated state; wherein, the third flag may be 1 or 0; correspondingly, the fourth flag may be 0 or 1; the third flag and the fourth flag are two arbitrary different flags, as long as they are capable of differentiating between two different states. That is to say, in order to implement the backup mode of backing up the redundancy parity data in an updated state according to the present disclosure, in the embodiment of the present disclosure, the second backup flag is set, and the third flag and the fourth flag are employed to represent different states of the redundancy parity data.

It should be noted that, how may logical pages as shown in FIG. 6 one L2 Parity corresponds to is related to the memory array of the memory and a specific RAIN mode. In one example, as shown in FIG. 11, one piece of L2 Parity corresponds to 127 logical pages.

In some embodiments, the sequentially writing the redundancy parity data in an updated state into the backup region to be used may include traversing the redundancy parity data in the redundancy parity cache included in the memory controller, backing up redundancy parity data whose second backup flag is the third flag to the currently used backup region or the backup region to be used, skipping redundancy parity data whose second backup flag is the fourth flag without backing up, until all redundancy parity data in the redundancy parity cache is traversed.

It should be noted that the traversal mode here may refer to the above-mentioned traversal mode when backing up all redundancy parity data in the redundancy parity cache. No further details will be described here. The difference is that, only the redundancy parity data in an updated state will be backed up here, and the redundancy parity data in a non-updated state will not be backed up, until all the redundancy parity data in the redundancy parity cache have been traversed.

In some embodiments, the operating method further includes setting the second backup flag corresponding to the redundancy parity data as the fourth flag, after completing backup of the redundancy parity data in an updated state.

Here, after the redundancy parity data in an updated state is backed up, the second backup flag is recovered to the fourth flag for subsequent use.

In some embodiments, the operating method may further include checking the first backup flag, in response to an operation mode switch command or a reconstruction command, performing a backup operation on the redundancy parity data in the memory controller based on the backup mode determined by the first backup flag, wherein, the operation mode switch command includes one of the following: a start stop unit SSU mode switch command, a standby mode switch command, and a write booster WB mode switch command; and the reconstruction command includes a command that a backup region having stored redundancy parity data needs to re-store required redundancy parity data due to failure.

It should be noted that timing and steps of redundancy parity data backup for the storage device are indicated here.

Here, the timing of backup may include but not limited to responding to the operation mode switch command or the reconstruction command, wherein, the operation mode switch command includes one of the following: the start stop unit SSU mode switch command, the standby mode switch command, and the write booster WB mode switch command, wherein, the SSU mode switch command is used by the host to switch power consumption modes of the device including the memory system and coupled thereto. For example, when the storage device coupled to the host is UFS, the UFS defines 4 basic power consumption modes: Active, Idle, Power Down and Sleep (briefly referred to as AIDS), plus 3 transitional power consumption modes: Pre-Active, Pre-Sleep and Pre-Power Down, a total of 7 power consumption modes. Active mode: a state when the UFS device is performing a command or a background operation; Idle mode: a state when the UFS device is idle, that is, when there is neither a command from the UFS host nor a background task of its own need to be processed; Sleep mode: a state that the UFS device enters after the UFS device is in the Idle mode for a certain period of time; and in the Sleep mode, a VCC power source may be cut off (depending on design of the UFS device), that is, flash power supply may be cut off. Power Down mode: Power-off mode, that is, a power source supplying power to the UFS stops supplying power to the UFS. In the Power Down mode, all power sources such as VCC, VCCQ and VCCQ2 may be cut off (depending on design of the UFS device), and such mode is a power consumption mode that is most power saving.

Figure 12:
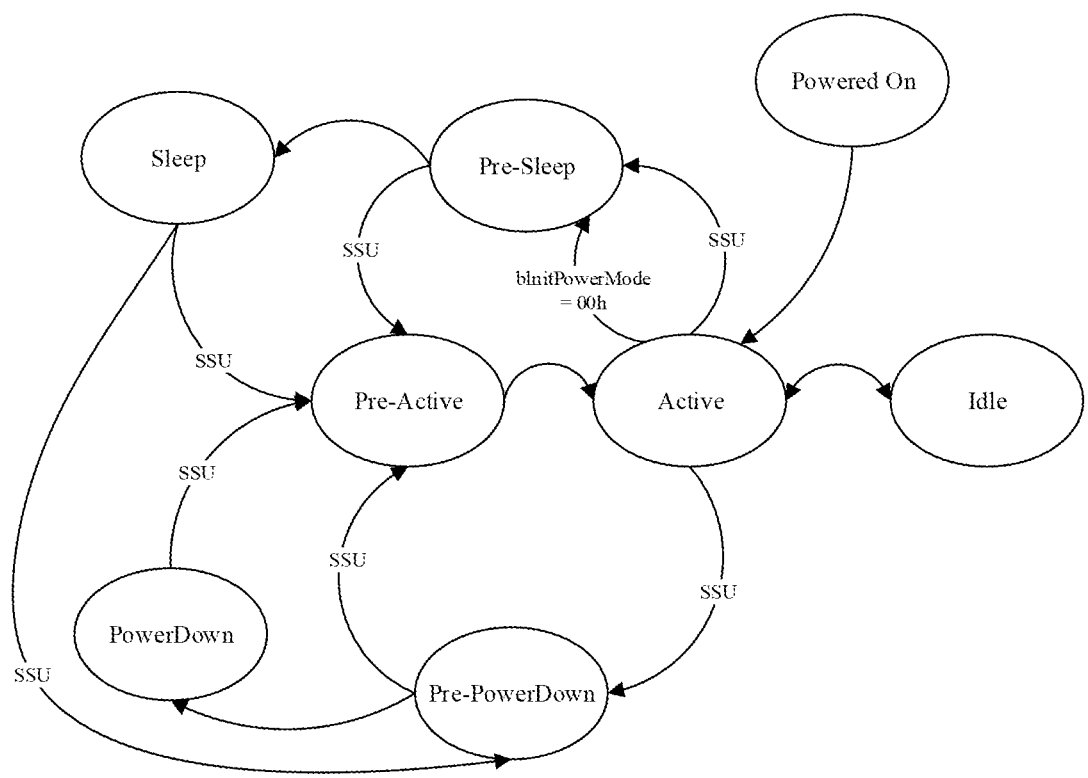
FIG. 12 shows a relationship schematic diagram of switching 7 power consumption modes included in the present disclosure through an SSU command when the storage device coupled to the host and including the memory system is UFS provided by the present disclosure.

As shown in FIG. 12, the switching between the above-described 7 power consumption modes mostly proceeds with the SSU command as described above. Wherein, a parameter bInitPowerMode defines a power source mode that the storage device should convert to after completing an initialization stage. When the bInitPowerMode=00h, it indicates that the storage device automatically enters the Sleep mode via the Pre-Sleep mode. Conversion between the respective power consumption modes in FIG. 12 conforms to the relevant protocols formulated. Based on the study focus and limited space of the present disclosure, the content of the specific protocol content will not be further described here. It should be known that, when the UFS switches to a relatively power saving mode (the Idle mode, the Sleep mode, and the Power Down mode), some functions in the UFS may not be implemented. For example, functions such as the write operation, the read operation, and the erase operation and/or the like, may not be implemented by the memory controller on the memory. In addition, since the cache of the memory controller mostly has a volatile memory structure, in order to prevent data loss, it is necessary to back up data that is still valid in the memory controller, for example, the redundancy parity data in an updated state in the redundancy parity cache of the memory controller.

Wherein, in the standby mode, that is, the Auto standby mode, the memory system coupled to the host is also in a power saving mode. At this time, data to be backed up also needs to be backed up before the memory system enters the standby mode.

Wherein, the Write Booster (WB) mode is a new function introduced in the UFS 2.2 and UFS 3.1 specifications; and write performance of UFS is improved by caching write. In the technical field of memory system, write performance of MLC/TLC/QLC NAND is significantly lower than that of SLC NAND, because MLC/TLC/QLC bits defined in logical require more programming steps and have a higher error correction probability. In some embodiments, in order to improve write performance, if the memory array in the memory system is MLC/TLC/QLC NAND, some of the memory cells are configured as SLC NAND and used as write buffers (or referred to as Write Booster Buffers) to process write requests at lower delay, so as to improve overall write performance. Then, before the memory system switches to the WB mode, the data to be written to the memory array in the form of MLC/TLC/QLC needs to be backed up. For example, the redundancy parity data in an updated state in the redundancy parity cache of the memory controller may normally need to be written to the memory array in the form of MLC/TLC/QLC programming; and after receiving the WB mode switch command, the memory controller needs to firstly back up the redundancy parity data in an updated state to the backup region of the memory array.

That is to say, after the memory controller receives one of the above operation mode switch commands, the memory system where the memory controller is located will either enter the power saving operation mode or enter the operation mode of writing data to the write buffer firstly in the SLC programming mode; at this time, in order to ensure no data loss in the cache of the memory controller, the data needs to be backed up, that is, the redundancy parity data needs to be backed up according to the present disclosure.

In some embodiments, the reconstruction command may refer to a command that a backup region having stored redundancy parity data needs to re-store required redundancy parity data due to failure. The reason why the backup region needs to be reconstructed is that: some of the redundancy parity caches in the redundancy parity cache may neither be backed up nor stored in a corresponding location of the memory array in the event of a sudden power failure. After power supply is recovered, the memory controller will re-compute the redundancy parity data that has not been backed up or written to the memory array, and back up the redundancy parity data to the backup region.

In some embodiments, for the steps of the backup, firstly checking the first backup flag to determine the backup mode, and then performing the backup based on the determined backup mode. The above-mentioned content has illustrated how to back up in different backup modes in detail, and no further details will be described here.

During actual application, the erasing the backup region having stored the redundancy parity data may include controlling, by the memory controller, the peripheral circuit of the memory to select Blocks contained in the backup region having stored the redundancy parity data to erase together or sequentially. Since the erasure process is not the focus of the present disclosure, any mode may be employed as long as the used backup region may be erased, and the specific erase process will not be further described here.

In some embodiments, the determining the quantity of all backup regions for storing redundancy parity data including the backup region to be used in the memory array, may include checking a backup management table, to determine the quantity of all backup regions for storing redundancy parity data including the backup region to be used in the memory array, wherein the backup management table is a backup management table for all backup regions for storing redundancy parity data including the backup region to be used.

In some embodiments, the operating method further includes updating a first management information corresponding to the backup region to be used to the backup management table, deleting a second management information corresponding to the backup region having stored redundancy parity data in the erased memory array from the backup management table, wherein, the first management information at least includes the first address information of the backup region to be used in the memory; and the second management information at least includes the second address information of the used backup region in the memory.

It should be noted that the backup management table may be a linked list. The linked list may be a discontinuous linear memory structure in terms of physical memory storage, a logical order of data elements is implemented by pointers link sequence in the linked list. In the embodiment of the present disclosure, the backup management table maintained by the memory controller may be consist of a series of nodes; each node includes two portions: a first portion is a data domain for storing the second management information; and a second portion is a pointer domain for storing a first address pointing to a next node. When the memory controller determines a new backup region to be used, the memory controller inserts the first management information corresponding to the backup region to be used in the backup management table; the first management information may include the first address information corresponding to the backup region to be used. When the memory controller erases a used backup region, the memory controller deletes the second management information corresponding to the used backup region in the backup management table, wherein, the second management information may include the second address information corresponding to the used backup region. It should be understood that the first address information and the second address information mentioned here are physical address or logical address of the backup region in the memory array.

During actual application, in order to insert and delete nodes in the backup management table, the backup management table will specify a root node; and the root node may be a first node of the backup management table. The backup management table further includes a node counter, and the node counter is used to count the quantity of nodes in the whole linked list. Based on this, in the embodiments of the present disclosure, the backup management table may be viewed to determine the quantity of all backup regions for storing redundancy parity data including the backup region to be used in the memory array. In addition, the first management information corresponding to the backup region to be used is inserted into the backup management table; the second management information corresponding to the backup region having stored redundancy parity data in the erased memory array is deleted from the backup management table, so as to maintain the backup management table. The backup management table is stored in the cache of the memory controller and/or the memory array.

Figure 13:
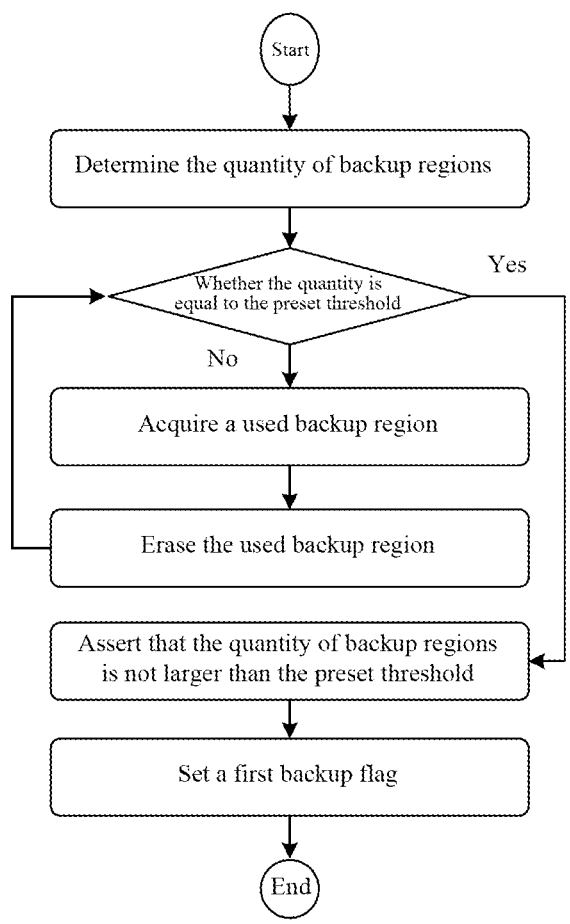
FIG. 13 shows a schematic flow chart for implementing the operating method shown in FIG. 9 provided by the embodiment of the present disclosure.
Figure 14:
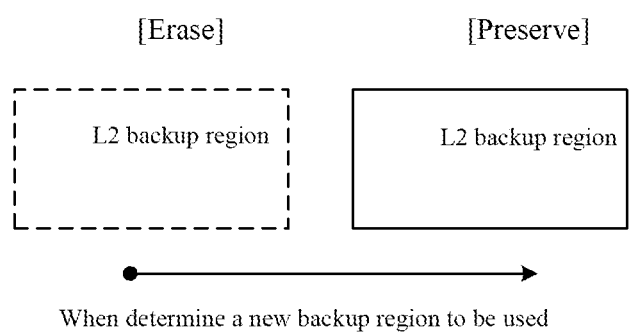
FIG. 14 shows a schematic diagram of beneficial effects of using the operating method shown in FIG. 9 provided by the embodiment of the present disclosure.
Figure 15:
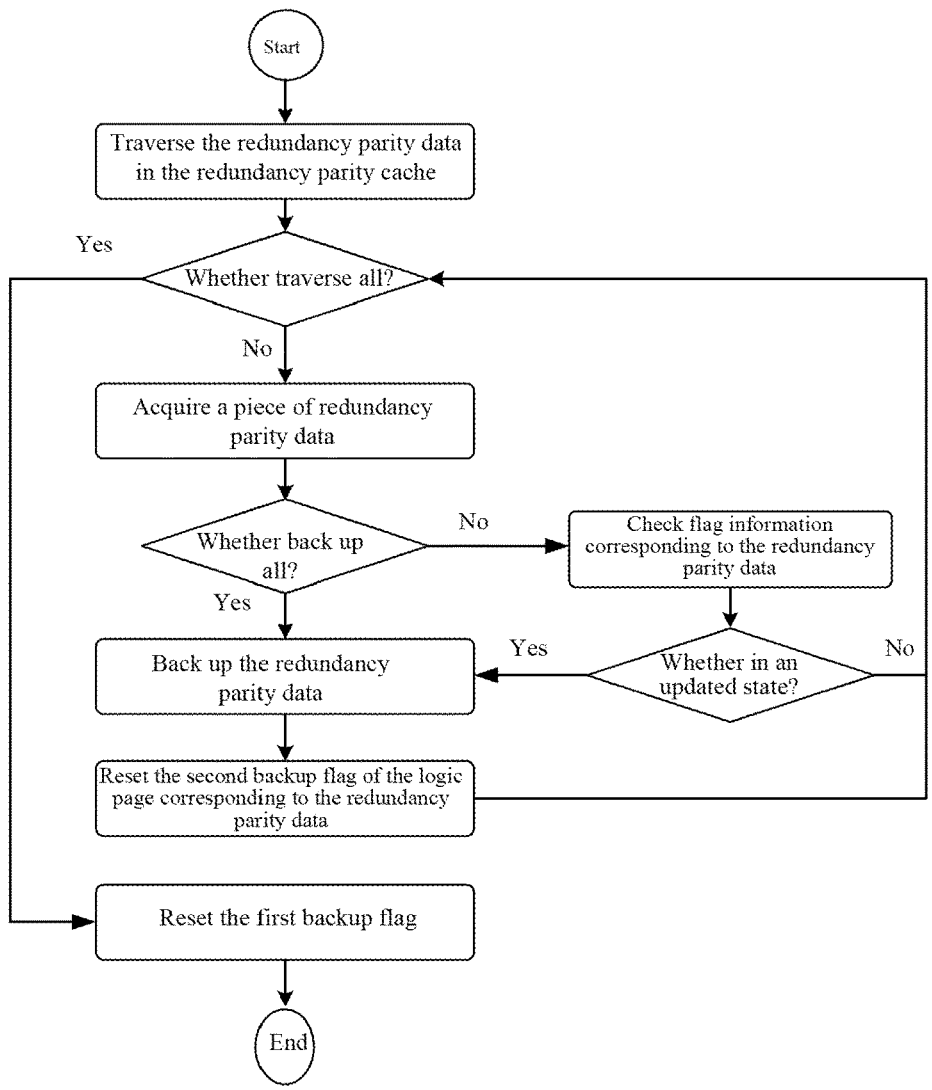
FIG. 15 shows a schematic flow chart of data backup of a memory system provided by the embodiment of the present disclosure.

To understand the present disclosure, referring to FIG. 13 to FIG. 15, wherein, FIG. 13 shows a schematic flow chart of management of the backup region for backing up L2 Parity provided by the embodiment of the present disclosure; FIG. 14 shows a schematic diagram of beneficial effects of the management mode of the backup region of L2 Parity shown in FIG. 12 employed by the present disclosure; and FIG. 15 shows a schematic flow chart of specific backup of L2 Parity based on the management mode according to the present disclosure provided by the embodiment of the present disclosure.

In FIG. 13, it should be noted that there may be more than one backup region having stored L2 Parity. Therefore, the process described in FIG. 13 is a step-by-step process. The specific process may be as follows: determining the quantity of all backup regions for backing up L2 Parity, including the newly created backup region to be used; deciding whether the quantity is equal to the preset threshold, wherein, the result determined firstly is not equal to the preset threshold; next, acquiring a backup region having stored L2 Parity, and erasing the backup region having stored L2 Parity; then re-determining the quantity of backup regions of L2 Parity excluding the erased backup regions; then re-deciding whether the quantity at this time is equal to the preset threshold; when the quantity is not equal to the preset threshold, re-acquiring a backup region having stored L2 Parity, and erasing the backup region having stored L2 Parity. Follow the cycle of the first two steps until determining that the quantity is equal to the preset threshold, and then an assertion function is used to exclude exception, that is, to assert that the quantity of backup regions is not larger than the preset threshold; thereafter, the first backup flag is set as the first flag for a subsequent backup process. The exception is just the situation that the quantity of backup regions is still larger than the preset threshold after the erasing. When the above exception occurs, the process in FIG. 13 ends, so as to check the cause of failure.

To summarize the process shown in FIG. 13, when the determined quantity of all backup regions for backing up L2 Parity including the newly created backup region to be used is larger than the preset threshold, the backup region having stored L2 Parity is directly erased, and only the backup regions whose quantity is equal to the preset threshold are preserved. Since there may be more than one backup region having stored L2 Parity, when erasing the backup region having stored L2 Parity, it is necessary to obtain and erase one by one; every time a backup region having stored L2 Parity is erased, it is necessary to re-decide the quantity of backup regions, re-acquire and re-erase, until the quantity of backup regions reaches the preset threshold, and only the backup regions whose quantity is equal to the preset threshold are preserved.

In some embodiments, if the preset threshold is 1, as shown in FIG. 14, when a backup region to be used is newly created, the backup region having stored L2 Parity is erased, and the quantity of backup regions is always 1, which may save 1 to 2 backup regions as compared with the backup region use case in the scenario shown in FIG. 7. By using the above-described backup region management mode, a life cycle of the backup region is shortened and the quantity of backup regions used is reduced. In this way, the quantity of Blocks allocated to the system pool may be appropriately reduced, and the quantity of Blocks allocated to the user data pool may be increased. Usually, the user capacity is determined; and based on this, the quantity of OP increases, thereby improving performance and durability of the product.

Based on the above-mentioned management mode of the backup region, the backup flow for L2 Parity may be as shown in FIG. 15. In FIG. 15, the backup mode for L2 Parity is decided according to the first backup flag; when the first backup flag is the first flag, the backup mode is: backing up all L2 Parity in the redundancy parity cache. A specific backup flow has been described in detail above, and no further details will be described here. When the first backup flag is the second flag, the backup mode is: backing up all L2 Parity in an updated state in the redundancy parity cache. For specific backup, the state of the redundancy parity data is determined according to the second backup flag, so as to back up the L2 Parity in an updated state; the specific flow has been described in detail above, and no further details will be described here. Finally, after the backup is completed, the first backup flag and the second backup flag may be both recovered to the original flags, which are respectively the second flag and the fourth flag.

Having gone through the above-described backup region management mode and L2 Parity backup flow, it is ensured that all L2 Parity has been backed up to the backup region to be used, and no Cross VB will occur. Therefore, the used backup region no longer needs to be preserved in the memory array.

In the operating method of the memory controller provided by the embodiment of the present disclosure, after determining a new backup to be used, decide whether the total quantity of backup regions is larger than the preset threshold; when the quantity is larger than the preset threshold, erase the used backup regions to only maintain backup regions whose quantity is less than or equal to the preset threshold, and reduce a service life cycle of the used backup regions, so as to increase OP and improve performance and durability of the storage device.

Based on a same inventive concept, the present disclosure further provides a memory controller, wherein, the memory controller is included in a memory system; the memory system further includes a memory having a memory array and controlled by the memory controller; the memory controller includes a processor; wherein, the processor is configured to determine a backup region to be used in an idle state from the memory array, when detect that remaining capacity of a currently used backup region for storing redundancy parity data in the memory array is less than a required capacity of redundancy parity data to be written;

determine the quantity of all backup regions for storing redundancy parity data including the backup region to be used in the memory array;

decide whether the quantity is larger than a preset threshold; and erase backup regions having stored redundancy parity data in the memory array, when the quantity is larger than the preset threshold.

In some embodiments, the processor is further configured to set a first backup flag; the first backup flag is used to indicate a backup mode of redundancy parity data in a redundancy parity cache of the memory controller;

wherein, when the first backup flag is a first flag, the backup mode includes backing up all redundancy parity data in the memory controller to the backup region to be used.

In some embodiments, the processor is further configured to set the first backup flag as the second flag, after responding to all redundancy parity data in the memory controller having been backed up to the backup region to be used; wherein, when the first backup flag is the second flag, the backup mode includes: backing up redundancy parity data in an updated state in the memory controller to the backup region to be used.

In some embodiments, the processor is further configured to check the first backup flag, in response to an operation mode switch command or a reconstruction command; and perform a backup operation on the redundancy parity data in the memory controller based on the backup mode determined by the first backup flag;

wherein, the operation mode switch command includes one of the following: a start stop unit SSU mode switch command, a standby mode switch command, and a write booster WB mode switch command; and the reconstruction command includes a command that a backup region having stored redundancy parity data needs to re-store required redundancy parity data due to failure.

In some embodiments, the processor is further configured to traverse the redundancy parity data in the redundancy parity cache included in the memory controller, and sequentially write all the redundancy parity data in the redundancy parity cache into the backup region to be used.

In some embodiments, the processor is further configured to determine a state of the redundancy parity data in the redundancy parity cache of the memory controller, and sequentially write the redundancy parity data in an updated state into the backup region to be used.

In some embodiments, the processor is further configured to check the second backup flag corresponding to the redundancy parity data, and determine a state of the redundancy parity data based on the second backup flag, wherein, when the second backup flag is a third flag, determining that the state of the redundancy parity data is an updated state; when the second backup flag is a fourth flag, determining that the state of the redundancy parity data is a non-updated state.

In some embodiments, the memory controller further includes a first communication interface coupled with the host; and the first communication interface is configured to receive the operation mode switch command or the reconstruction command sent by the host.

In some embodiments, the memory controller further includes: a second communication interface coupled with the memory; the second communication interface is configured to send a first write command or a second write command to the memory; the first write command is used to instruct to back up all redundancy parity data in the memory controller to the backup region to be used; and the second write command is used to instruct to sequentially write the redundancy parity data in an updated state into the backup region to be used.

Here, the first communication interface may be the front-end interface in the above-mentioned example; and the second communication interface may be the back-end interface in the above-mentioned example.

It should be noted that the memory controller and the above-mentioned operating method of the memory controller belong to a same inventive concept. The terms appearing in the memory controller have been explained in details in the above-mentioned operating method and memory controller, which are also applicable here, and no further details will be described here. It should be understood that only the structure of the memory controller most related to the technical solution of the present disclosure is described herein. For the structure and description of the memory controller shown in FIG. 1 to FIG. 3, the memory controller provided by the present disclosure is also included and applicable. The memory controller further includes structures that are not shown but are necessary for normal operations of the memory system; and in view of the length of the application document, no further details will be described in the present disclosure.

Figure 16:
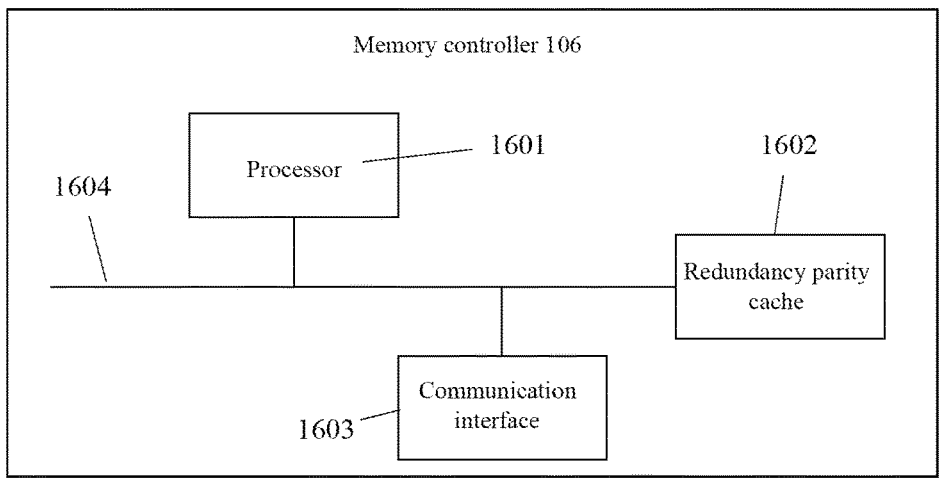
FIG. 16 shows a structural schematic diagram of hardware of a memory controller provided by the embodiment of the present disclosure.

For example, FIG. 16 shows a structural schematic diagram of hardware of a memory controller provided by the present disclosure. The memory controller 106 includes at least one processor 1601, a redundancy parity cache 1602 and at least one communication interface 1603 (e.g., the first communication interface and the second communication interface as described above); the respective components in the memory controller 106 are coupled together through a bus system 1604; it may be understood that the bus system 1604 is used to enable connected communications between these components. In addition to a data bus, the bus system 1604 further includes a power bus, a control bus and a state signal bus. However, for sake of clarity, various buses are labeled as a bus system 1604 in FIG. 16.

It may be understood that the redundancy parity cache 1602 may refer to any one or any combination of Level 1 cache (L1 Cache), Level 2 cache (L2 Cache), and Level 3 cache (L3 Cache).

The memory controller 106 may further include other memory structures; and the memory structures are collectively referred to as a memory. The memory may be a volatile memory or a non-volatile memory, or may also include both the volatile memory and the non-volatile memory. Wherein, the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a Compact Disc Read-Only Memory (CD-ROM); and the magnetic surface memory may be a disk memory or a tape memory. The volatile memory may be a Random Access Memory (RAM), which is used as an external cache. By way of exemplary but not limitative illustration, a plurality of forms of RAM are available, for example, a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The redundancy parity cache 1602 described in the embodiments of the present disclosure is intended to include, but not limited to, these and any other suitable types of memories.

The redundancy parity cache 1602 according to the embodiment of the present disclosure is used to store various types of data to support operations of the memory controller 106. Examples of such data include: any computer program for operation on the memory controller 106, for example, the redundancy parity data may be included in the redundancy parity cache 1602.

The methods disclosed in the embodiments of the present disclosure may be applied to the processor 1601 or implemented by the processor 1601. The processor may be an integrated circuit chip having signal processing capability. During implementation, the respective steps of the above-described method may be completed by the integrated logic circuit of hardware or instructions in the form of software in the processor. The above-described processor may be a general-purpose processor, a Digital Signal Processor (DSP), or other programmable logic devices, a discrete gate or a transistor logic device, a discrete hardware component, etc. The processor may implement or perform the respective methods, steps and logic block diagrams disclosed in the embodiments of the present disclosure. The general-purpose processor may be a microprocessor or any other processor, etc. The steps of the method disclosed in combination with the embodiments of the present disclosure may be directly embodied to be completed through execution by the hardware coding processor or to be completed through execution by a combination of hardware and software modules in the coding processor. The software module may be located in a storage medium; the storage medium is located in the memory; and the processor reads information in the memory and completes the steps of the above-mentioned method in combination with hardware thereof.

In an exemplary embodiment, the memory controller 106 may be implemented by one or more Application Specific Integrated Circuits (ASICs), DSPs, Programmable Logic Devices (PLDs), Complex Programmable Logic Devices (CPLDs), Field-Programmable Gate Arrays (FPGAs), general-purpose processors, controllers, Micro Controller Units (MCUs), Microprocessors, or other electronic components, for performing the above-described methods.

In several embodiments provided by the present disclosure, it should be understood that the disclosed device and method may be implemented in other ways. The device embodiment as described above is merely exemplary. For example, the division of the units is merely logical function division and there may be other division mode in actual implementation. For example, a plurality of units or components may be combined or integrated into another system, or some features may be ignored or not performed. In addition, mutual coupling or direct coupling or communicative connection between the respective components as showed or discussed may be through some interfaces, and an indirect coupling or communicative connection between devices or units may be electrical, mechanical or in other form.

The above-described units illustrated as separate components may be, or may not be physically separated, and the components showed as units may be, or may not be physical units, that is, they may be located in one place, or may also be distributed among a plurality of network units; and some or all of the units may be selected to achieve the purpose of the solutions of this embodiment according to actual needs.

In addition, the respective functional units according to the respective embodiments of the present disclosure may be fully integrated into a processing unit, or each unit may be separately used as an individual unit, or two or more units may be integrated into a unit; the above-described integrated units may be implemented in a form of hardware, or may also be implemented in a form of hardware plus software functional units.

Those ordinarily skilled in the art may understand that: all or part of the steps in the above-described method embodiments may be implemented by program instruction-related hardware; the above-mentioned program may be stored in a computer readable storage medium; when the program is performed, the steps including the above-described method embodiments are performed; and the above-mentioned storage medium includes: a removable storage device, a Read Only Memory (ROM), a Random Access Memory (RAM), a magnetic disk or an optical disk and various other media that may store program codes.

Or, if the above-described integrated unit according to the present disclosure is implemented in a form of software functional module and sold or used as an independent product, it may also be stored in a computer readable storage medium. Based on such understanding, the technical solution of the embodiments of the present disclosure, in essence, or the part that contributes to the prior art, may be embodied in a form of a software product; the computer software product is stored in a storage medium and includes several instructions to enable a computer device (which may be a personal computer, a server, or a network device, etc.) to perform all or part of the methods according to the respective embodiments of the present disclosure. The above-mentioned storage medium includes: a removable storage device, a Read Only Memory (ROM), a Random Access Memory (RAM), a magnetic disk or an optical disk and various other media that can store program codes.

Based on the above-mentioned solution, the present disclosure further provides a memory system, including: one or more memories; the one or more memories including a memory array, and a memory controller coupled with the one or more memories and used to control the one or more memories. The memory controller includes a processor that is configured to determine a backup region to be used in an idle state from the memory array, when detect that remaining capacity of a currently used backup region for storing redundancy parity data in the memory array is less than a required capacity of redundancy parity data to be written, determine the quantity of all backup regions for storing redundancy parity data including the backup region to be used in the memory array, decide whether the quantity is larger than a preset threshold, and erase backup regions having stored redundancy parity data in the memory array, when the quantity is larger than the preset threshold.

In some embodiments, the memory controller further includes a redundancy parity cache and a first communication interface coupled with the host; the first communication interface is configured to receive an operation mode switch command or a reconstruction command sent by the host, the processor is further configured to check the first backup flag in response to the operation mode switch command or the reconstruction command, and perform a backup operation on the redundancy parity data in the redundancy parity cache based on the backup mode determined by the first backup flag, wherein, the operation mode switch command includes one of the following: a start stop unit SSU mode switch command, a standby mode switch command, and a write booster WB mode switch command; and the reconstruction command includes a command that a backup region having stored redundancy parity data needs to re-store required redundancy parity data due to failure.

In some embodiments, the memory controller further includes a redundancy parity cache and a second communication interface coupled with the one or more memories; the processor is further configured to generate a first write command or a second write command; wherein, the first write command is used to instruct to back up all redundancy parity data in the redundancy parity cache to the backup region to be used, and the second write command is used to instruct to sequentially write the redundancy parity data in an updated state in the redundancy parity cache into the backup region to be used, the second communication interface is configured to send the first write command or the second write command to the one or more memories, the one or more memories are configured to back up all redundancy parity data in the redundancy parity cache to the backup region to be used, in response to the first write command, or, sequentially write the redundancy parity data in an updated state in the redundancy parity cache into the backup region to be used, in response to the second write command.

In some embodiments, the memory system is included in one of the following: a solid state hard disk SSD, and a storage card.

Here, the first communication interface may be the front-end interface in the above-mentioned example; and the second communication interface may be the back-end interface in the above-mentioned example.

It should be noted that the memory system and the above-mentioned operating method of the memory controller belong to a same inventive concept. The memory system includes the above-mentioned memory controller, and therefore, the terms appearing here have been explained in details in the above-mentioned operating method and memory controller, which are also applicable here, and no further details will be described here. It should be understood that only the structure of the memory controller most related to the technical solution of the present disclosure is described here. For the structure and description of the memory system shown in FIG. 1 to FIG. 6, the memory system provided by the present disclosure is also included and is applicable. The memory system further includes structures that are not shown but are necessary for normal operations of the memory system; and in view of the length of the application document, no further details will be described in the present disclosure.

The present disclosure further provides an electronic device, including a memory system; wherein, the memory system includes one or more memories, and the one or more memories include a memory array; and a memory controller coupled with the one or more memories and used to control the one or more memories; and a host coupled with the memory system, The memory controller includes a processor that is configured to determine a backup region to be used in an idle state from the memory array, when detect that remaining capacity of a currently used backup region for storing redundancy parity data in the memory array is less than a required capacity of redundancy parity data to be written; determine the quantity of all backup regions for storing redundancy parity data including the backup region to be used in the memory array, decide whether the quantity is larger than a preset threshold; and erase backup regions having stored redundancy parity data in the memory array, when the quantity is larger than the preset threshold.

In some embodiments, the memory controller further includes a redundancy parity cache, a first communication interface coupled to the host and a second communication interface coupled to the one or more memories. The host is configured to send an operation mode switch command or a reconstruction command to the memory controller, and the first communication interface is configured to receive the operation mode switch command or the reconstruction command. The processor is further configured to check the first backup flag in response to the operation mode switch command or the reconstruction command, perform a backup operation on the redundancy parity data in the redundancy parity cache based on the backup mode determined by the first backup flag; generate a first write command or a second write command during backup, and send the first write command or the second write command to the one or more memories through the second communication interface. The one or more memories are configured to back up all redundancy parity data in the redundancy parity cache to the backup region to be used, in response to the first write command, or, sequentially write the redundancy parity data in an updated state in the redundancy parity cache into the backup region to be used, in response to the second write command.

The operation mode switch command includes one of the following: a start stop unit SSU mode switch command, a standby mode switch command, and a write booster WB mode switch command; and the reconstruction command includes a command that a backup region having stored redundancy parity data needs to re-store required redundancy parity data due to failure.

Here, the first communication interface may be the front-end interface in the above-mentioned example; and the second communication interface may be the back-end interface in the above-mentioned example.

It should be noted that the electronic device and the above-mentioned operating method of the memory controller belong to a same inventive concept. The electronic device includes the above-mentioned memory system, and therefore, the terms appearing here have been explained in details in the above-mentioned operating method and memory controller, which are also applicable here, and no further details will be described here. It should be understood that only the structure most related to the technical solution of the present disclosure is described here. For the structure and description of the electronic device shown in FIG. 1, the electronic device provided by the present disclosure is also included and applicable. The electronic device further includes structures that are not shown but are necessary for normal operations of the electronic device; and in view of the length of the application document, no further details will be described in the present disclosure.

The above merely are preferred embodiments of the present disclosure, and not intended to limit the scope of the present disclosure.

The invention claimed is:

1. An operating method of a memory controller included in a memory system including a memory having a memory array that is controlled by the memory controller, the operating method comprising: upon a determination that first redundancy parity data in the memory controller is to be backed up into the memory array, comparing a remaining capacity of a currently used backup region for storing redundancy parity data in the memory array with a required capacity of the first redundancy parity data to be backed up; in response to determining the remaining capacity of the currently used backup region is less than the required capacity, assigning an idle backup region in the memory array, as a backup region to be used; comparing a number of all backup regions for storing redundancy parity data in the memory array, including the backup region to be used, with a preset threshold; in response to determining the number is larger than the preset threshold, erasing backup regions having stored redundancy parity data in the memory array, and using a first backup mode to back up the first redundancy parity data in the memory controller into the backup region to be used; and in response to determining the number is equal to or less than the preset threshold, using a second backup mode to back up the first redundancy parity data in the memory controller into the backup region to be used, wherein the second backup mode is different from the first backup mode.

2. The operating method according to claim 1, further comprising: setting a first backup flag, the first backup flag being used to indicate whether the first backup mode or the second backup mode is applied for the first redundancy parity data in a redundancy parity cache of the memory controller, wherein, when the first backup flag is a first flag, the first backup mode is applied, which includes backing up all of the first redundancy parity data in the memory controller into the memory array.

3. The operating method according to claim 2, further comprising: setting the first backup flag as a second flag, after all of the first redundancy parity data in the memory controller has been backed up to the memory array, wherein, when the first backup flag is the second flag, the second backup mode is applied, which includes backing up the first redundancy parity data in an updated state in the memory controller into the memory array.

4. The operating method according to claim 3, wherein the backing up the first redundancy parity data in the updated state in the memory further comprises: determining a state of the first redundancy parity data in the redundancy parity cache of the memory controller, and sequentially writing the first redundancy parity data in the updated state into the memory array.

5. The operating method according to claim 4, wherein the determining the state of the first redundancy parity data in the redundancy parity cache of the memory controller further comprises: checking a second backup flag corresponding to the first redundancy parity data, and determining the state of the first redundancy parity data based on the second backup flag, wherein: in response to determining the second backup flag is a third flag, the state of the first redundancy parity data is determined as the updated state, and in response to determining the second backup flag is a fourth flag, determining that the state of the first redundancy parity data is determined as a non-updated state.

6. The operating method according to claim 5, wherein the sequentially writing the first redundancy parity data in the updated state into the memory array further comprises: traversing the first redundancy parity data in the redundancy parity cache included in the memory controller, backing up the first redundancy parity data whose second backup flag is the third flag to the memory array, and skipping the first redundancy parity data whose second backup flag is the fourth flag without backing up, until all of the first redundancy parity data in the redundancy parity cache is traversed.

7. The operating method according to claim 5, wherein the operating method further comprising: setting the second backup flag corresponding to the first redundancy parity data as the fourth flag, after completing backup of the first redundancy parity data in the updated state.

8. The operating method according to claim 2, wherein the backing up all of the first redundancy parity data in the memory controller further comprises: traversing the redundancy parity data in the redundancy parity cache of the memory controller, and sequentially writing all of the first redundancy parity data in the redundancy parity cache into the memory array.

9. The operating method according to claim 1, further comprising: in response to determining the remaining capacity of the currently used backup region is larger than or equal to the required capacity, using the second backup mode to back up the first redundancy parity data in the memory controller into the currently used backup region.

10. The operating method according to claim 1, wherein the determination that the first redundancy parity data in the memory controller is to be backed up into the memory array is made in response to receiving an operation mode switch command or a reconstruction commend from a host coupled with the memory controller.

11. The operating method according to claim 1, wherein the determining the number of all backup regions for storing redundancy parity data in the memory array further comprises:
   checking a backup management table, to determine the number of all backup regions for storing redundancy parity data in the memory array, including the backup region to be used,
   wherein the backup management table is a backup management table for all backup regions for storing redundancy parity data in the memory array, including the backup region to be used.

12. The operating method according to claim 11, further comprising:
   updating first management information corresponding to the backup region to be used to the backup management table; and
   deleting second management information corresponding to the backup region having stored redundancy parity data in the erased memory array from the backup management table,
   wherein:
      the first management information at least includes first address information of the backup region to be used in the memory, and
      the second management information at least includes second address information of the used backup region in the memory.

13. A memory controller that is included in a memory system including a memory having a memory array and controlled by the memory controller, wherein the memory controller includes a processor that is configured to: upon a determination that first redundancy parity data in the memory controller is to be backed up into the memory array, compare a remaining capacity of a currently used backup region for storing redundancy parity data in the memory array with a required capacity of the first redundancy parity data to be backed up; in response to determining the remaining capacity of the currently used backup region is less than the required capacity, assign an idle backup region in the memory array, as a backup region to be used; compare a number of all backup regions for storing redundancy parity data in the memory array, including the backup region to be used, with a preset threshold; in response to determining the number is larger than the preset threshold, erase backup regions having stored redundancy parity data in the memory array, and use a first backup mode to back up the first redundancy parity data in the memory controller into the backup region to be used; and in response to determining the number is equal to or less than the preset threshold, use a second backup mode to back up the first redundancy parity data in the memory controller into the backup region to be used, wherein the second backup mode is different from the first backup mode.

14. The memory controller according to claim 13, wherein the processor is further configured to set a first backup flag that is used to indicate whether the first backup mode or the second backup mode is applied for the first redundancy parity data in a redundancy parity cache of the memory controller, and when the first backup flag is a first flag, the first backup mode is applied, which includes backing up all of the first redundancy parity data in the memory controller into the memory array.

15. The memory controller according to claim 14, wherein the processor is further configured to set the first backup flag as a second flag, after all of the first redundancy parity data in the memory controller has been backed up to the memory array, and when the first backup flag is the second flag, the second backup mode is applied, which includes backing up the first redundancy parity data in an updated state in the memory controller into the memory array.

16. The memory controller according to claim 14, wherein the processor is further configured to back up all of the first redundancy parity data in the memory controller by: traversing the redundancy parity data in the redundancy parity cache included in the memory controller, and sequentially writing all the first redundancy parity data in the redundancy parity cache into the memory array.

17. The memory controller according to claim 15, wherein the processor is further configured to back up the first redundancy parity data in the updated state in the memory controller by: determining a state of the first redundancy parity data in the redundancy parity cache of the memory controller, and sequentially writing the first redundancy parity data in the updated state into the memory array.

18. A memory system, comprising one or more memories and a memory controller coupled with the one or more memories and used to control the one or more memories, the one or more memories including a memory array, wherein the memory controller includes a processor that is configured to: upon a determination that first redundancy parity data in the memory controller is to be backed up into the memory array, compare a remaining capacity of a currently used backup region for storing redundancy parity data in the memory array with a required capacity of the first redundancy parity data to be backed up; in response to determining the remaining capacity of the currently used backup region is less than the required capacity, assign an idle backup region in the memory array, as a backup region to be used; compare a number of all backup regions for storing redundancy parity data in the memory array, including the backup region to be used, with a preset threshold; in response to determining the number is larger than the preset threshold, erase backup regions having stored redundancy parity data in the memory array, and use a first backup mode to back up the first redundancy parity data in the memory controller into the backup region to be used; and in response to determining the number is equal to or less than the preset threshold, use a second backup mode to back up the first redundancy parity data in the memory controller into the backup region to be used, wherein the second backup mode is different from the first backup mode.

19. The memory system according to claim 18, wherein the memory controller further includes a redundancy parity cache and a first communication interface coupled with a host, the first communication interface being configured to receive an operation mode switch command or a reconstruction command sent by the host, the processor is further configured to check a first backup flag indicating whether the first backup mode or the second backup mode is applied for the first redundancy parity data in a redundancy parity cache of the memory controller, in response to receipt of the operation mode switch command or the reconstruction command, and perform a backup operation on the first redundancy parity data in the redundancy parity cache based on the backup mode determined by the first backup flag, the operation mode switch command includes one of the following: a start stop unit SSU mode switch command, a standby mode switch command, and a write booster WB mode switch command, and the reconstruction command includes a command that a second backup region having stored redundancy parity data needs to re-store required redundancy parity data due to failure.

20. The memory system according to claim 18, wherein the memory controller further includes a redundancy parity cache and a second communication interface coupled with the one or more memories, the processor is further configured to generate a first write command or a second write command, the first write command being used to instruct to back up all of the first redundancy parity data in the redundancy parity cache to the backup region to be used, the second write command being used to instruct to sequentially write the first redundancy parity data in an updated state in the redundancy parity cache into the backup region to be used, the second communication interface is configured to send the first write command or the second write command to the one or more memories, and the one or more memories are configured to back up all of the first redundancy parity data in the redundancy parity cache to the backup region to be used, in response to the first write command, or, sequentially write the first redundancy parity data in the updated state in the redundancy parity cache into the backup region to be used, in response to the second write command.

* * * * *